US012612685B2

(12) United States Patent　(10) Patent No.:　US 12,612,685 B2
Schade et al.　(45) Date of Patent:　Apr. 28, 2026

(54) ALLOY COMPOSITIONS

(71) Applicant: Hoeganaes Corporation, Cinnaminson, NJ (US)

(72) Inventors: Christopher Schade, Marlton, NJ (US); Kerri Horvay, Philadelphia, PA (US); Jon Baumgartner, Columbus, NJ (US)

(73) Assignee: Hoeganaes Corporation, Cinnaminson, NJ (US)

( * ) Notice: Subject to any disclaimer, the term of this patent is extended or adjusted under 35 U.S.C. 154(b) by 0 days.

(21) Appl. No.: 18/602,344

(22) Filed: Mar. 12, 2024

(65) Prior Publication Data

US 2024/0254604 A1　　Aug. 1, 2024

Related U.S. Application Data

(63) Continuation of application No. 17/725,607, filed on Apr. 21, 2022, now abandoned.

(Continued)

(51) Int. Cl.
*C22C 38/48*　(2006.01)
*B22F 1/052*　(2022.01)
(Continued)

(52) U.S. Cl.
CPC .............. *C22C 38/48* (2013.01); *B22F 1/052* (2022.01); *B22F 9/082* (2013.01); *B22F 10/14* (2021.01);
(Continued)

(58) Field of Classification Search
CPC .......... B22F 1/052; B22F 10/14; B22F 10/64; B22F 2003/248; B22F 2009/0828;
(Continued)

(56) References Cited

U.S. PATENT DOCUMENTS 4,483,905 A　11/1984　Engstrom
4,834,800 A　5/1989　Semel
(Continued)

FOREIGN PATENT DOCUMENTS

EP　　0152160 A2 *　8/1985　............. C22C 38/04

OTHER PUBLICATIONS

R. Doherty, A. Lawley, T. Murphy, and C.T. Schade, "Processing and Properties of a Dual Phase PM Steel," Advances in Powder Metallurgy and Particulate Materials—2010, compiled by R. Lawcock. A. Lawley and P. McGeehan, Metal Powder Industries Federation, Princeton, NJ, 2008, part 7 pp. 121-133.

(Continued)

*Primary Examiner* — Jie Yang
(74) *Attorney, Agent, or Firm* — BakerHostetler

(57) ABSTRACT

The present disclosure provides compositions comprising iron, about 0.01 to about 0.4% w/w of manganese; about 1.3 to about 1.9% w/w of chromium; about 0.1% w/w or less of nickel; about 1.2 to about 1.7% w/w of molybdenum; about 0.01 to about 0.4% w/w of niobium; about 0.01 to about 0.4% w/w of vanadium; about 1.5 to about 2% w/w of silicon; and about 0.01 to about 0.20% w/w of carbon. The present disclosure also provides methods of preparing a metal powder, comprising atomizing a composition described herein and methods of preparing a metal object, comprising subjecting metal powder described herein to metal binder jetting.

26 Claims, 9 Drawing Sheets

Related U.S. Application Data

(60) Provisional application No. 63/255,670, filed on Oct. 14, 2021.

(51) Int. Cl.

| | |
|---|---|
| *B22F 9/08* | (2006.01) |
| *B22F 10/14* | (2021.01) |
| *B22F 10/64* | (2021.01) |
| *B33Y 10/00* | (2015.01) |
| *B33Y 40/10* | (2020.01) |
| *B33Y 40/20* | (2020.01) |
| *B33Y 70/00* | (2020.01) |
| *C22C 38/02* | (2006.01) |
| *C22C 38/04* | (2006.01) |
| *C22C 38/44* | (2006.01) |
| *C22C 38/46* | (2006.01) |

(52) U.S. Cl.
CPC .............. *B22F 10/64* (2021.01); *B33Y 10/00* (2014.12); *B33Y 40/10* (2020.01); *B33Y 40/20* (2020.01); *B33Y 70/00* (2014.12); *C22C 38/02* (2013.01); *C22C 38/04* (2013.01); *C22C 38/44* (2013.01); *C22C 38/46* (2013.01); *B22F 2301/35* (2013.01); *B22F 2304/10* (2013.01)

(58) Field of Classification Search
CPC .............. B22F 2301/35; B22F 2304/10; B22F 2998/10; B22F 2999/00; B22F 3/10; B22F 9/082; B33Y 10/00; B33Y 40/10; B33Y 40/20; B33Y 70/00; C22C 33/0264; C22C 38/02; C22C 38/04; C22C 38/22; C22C 38/24; C22C 38/26; C22C 38/34; C22C 38/44; C22C 38/46; C22C 38/48; Y02P 10/25
See application file for complete search history.

(56) References Cited

U.S. PATENT DOCUMENTS

| | | | | |
|---|---|---|---|---|
| 5,290,336 | A | 3/1994 | Luk | |
| 5,298,055 | A | 3/1994 | Semel | |
| 5,330,792 | A | 7/1994 | Johnson | |
| 5,368,630 | A | 11/1994 | Luk | |
| 5,498,276 | A | 3/1996 | Luk | |
| 5,997,805 | A * | 12/1999 | Lawcock | C22C 33/0207 419/29 |
| 6,602,315 | B2 | 8/2003 | Hendrickson | |
| 2006/0285989 | A1 * | 12/2006 | Schade | C22C 38/18 75/243 |
| 2016/0348222 | A1 * | 12/2016 | Isaac | C22C 38/22 |

OTHER PUBLICATIONS

G. Fillari, R. Causton, and Alan Lawley, "Effect of Cooling Rates During Sintering," Advances in Powder Metallurgy and Particulate Materials—2003, compiled by R. Lawcock. A. Lawley and P. McGeehan, Metal Powder Industries Federation, Princeton, NJ, 2008, part 7 pp. 121-133.

W.E. Frazier, "Metal Additive Manufacturing: A Review", Journal of Material Engineering, Performance, 2014 vol. 23, No. 6 pp. 1917-1928.

HP. Inc. Technical White Paper, "HP Metal Jet Technology," 2018. World Steel Auto Future Steel Vehicle Overview Report—2011.

A. Lawley, E. Wagner, and C.T. Schade, "Development of a High-Strength-Dual-Phase P/M Stainless Steel," Advances in Powder Metallurgy and Particulate Materials—2005, compiled by C. Ruas and T. Tomlin, Metal Powder Industries Federation, Princeton, NJ, 2005, part 7 pp. 78-89.

M. Li, W. Du, A. Elwany, Z. Pei and C. Ma, "Metal Binder Jet Additive Manufacturing", Journal of Manufacturing Science and Engineering, Sep. 2020, vol. 142 No. 9.

R.I. Sands and J.F. Watkinson, "Sintered Stainless Steel I.—The influence of Alloy Composition upon Compacting and Sintering Behaviour," Powder Metallurgy, 1960, No. 5, pp. 85-104.

N.B. Shaw and R.W.K. Honeycombe, "Some Factors Influencing the Sintering Behaviour of Austenitic Stainless Steels," Powder Metallurgy, 1977; vol. 20: pp. 191-198.

M.K. Singh, Application of Steel in Automotive Industry, Int. J. Emergin Technol. Adv. Eng. 6 (2016) 246-253.

C.C. Tasan, M. Diehl, D. Yan, M. Bechtold, F. Roters, L. Schemmann, C. Zheng, N. Peranio, D. Ponge, M. Koyama, K. Tsuzaki, D. Raabe, An Overview of Dual-Phase Steels: Advances in Microstructure-Oriented Processing and Micromechanically Guided Design, Annu. Rev. Mater. Res. 45 (2015) 391-431.

R. Doherty, A. Lawley, T. Murphy, and C.T. Schade, "Microstructure and Properties of a Microalloyed PM Steels," Advances in Powder Metallurgy and Particulate Materials—2011, compiled by R. Lawcock. A. Lawley and p. McGeehan, Metal Powder Industries Federation, Princeton, NJ, 2008, part 7 pp. 121-133.

R. Doherty, A. Lawley, T. Murphy, and C.T. Schade, "The Influence of Silicon on the Mechanical Properties and Hardenability of PM Steels," Advances in Powder Metallurgy and Particulate Materials—2013, compiled by R. Lawcock. A. Lawley and P. McGeehan, Metal Powder Industries Federation, Princeton, NJ, 2008, part 7 pp. 121-133.

R. Doherty, A. Lawley, P. Stears, and C.T. Schade, "Precipitation Hardening PM Stainless Steels," Advances in Powder Metallurgy and Particulate Materials—2006, compiled by R. Lawcock. A. Lawley and P. McGeehan, Metal Powder Industries Federation, Princeton, NJ, 2006, part 7 pp. 121-133.

U.S. Appl. No. 17/725,607, filed Apr. 21, 2022.

* cited by examiner

ALLOY COMPOSITIONS

CROSS-REFERENCE TO RELATED APPLICATIONS

This application is a continuation of U.S. patent application Ser. No. 17/725,607, filed Apr. 21, 2022, which claims the benefit of the priority of U.S. Provisional Patent Application No. 63/255,670, filed Oct. 14, 2021, the disclosures of which are hereby incorporated by reference in their entireties.

TECHNICAL FIELD

This disclosure provides novel alloy compositions and methods for using these compositions.

BACKGROUND

As with many metal processing techniques, powder metallurgy processes have evolved over the years with technologies such as warm compaction, injection molding, sinter-hardening, high temperature sintering, bonding, powder forging and green machining. Recently, additive manufacturing has been the latest technology to seek acceptance as a standard powder metallurgy process. While there are many types of additive manufacturing processes that can be classified either by the nature of the feedstock utilized (powder or wire) and/or the method by which the parts are fabricated (laser melted or glued by binder in the case of powders), one common theme is that the alloy composition (in the case of metals) and the processing must be considered together to produce a high performing finished product.

As with most additive manufacturing processes, metal binder jetting involves the deposition of powder layer by layer, with each layer and powder particle held together by a polymeric glue. The glue or binder is applied to the powder bed utilizing a print head very similar to those utilized by ink jet printing. Then, like conventional powder metallurgy processes, the part needs to be sintered to its final shape and density. Compared with the competing additive manufacturing technology, laser powder bed fusion, where the powder layers are melted together with the use of a laser, metal binder jetting lags in industrialization. However, with new and advanced machine technology being introduced, the throughput of the metal binder jetting has shown significant improvement and now the technology is targeting serial production of industrial parts. In addition, metal binder jetting is not limited to alloys which are weldable but can be utilize a wider range of materials. To achieve high densities (>98%), fine powders are used with a mean particle, $d_{50}$ size ranging from 10-15 μm. Utilizing fine powders results in a superior surface quality, about 20% better than laser powder bed fusion.

The automotive industry is evaluating the use of metal binder jetting for producing automotive parts. In particular, because of the ability of 3D printing to produce designs that are conducive to weight reductions, a particular interest by the automotive makers is the application of sheet material for body and chassis parts. These steels used for these applications are generally classified as advanced high strength steels.

Advanced high strength steels or micro alloyed steels generally give superior mechanical properties utilizing low alloy levels of alloy content coupled with thermo-mechanical processing (typically rolling in combination with accelerated cooling). Dual-phase (DP) steels are considered a subclass of advanced high strength steels and exhibit a microstructure consisting of a hard phase (primarily martensite and/or bainite) in a matrix of ferrite. Due to their composite microstructures, dual phase steels exhibit excellent mechanical properties with tensile strength generally dependent primarily on the volume fraction of martensite. Dual phase steels typically contain ~20% martensite grains that induce significant work hardening of ferrite and therefore, high ultimate tensile strengths. The high percentage of ferrite leads to high ductility with homogeneous plastic flow that eliminates the Luders bands and hence eliminates the wrinkling or stretcher marks and allows for a more aesthetically pleasing surface. Dual phase steels also benefit from the fact that their low carbon content makes them more weldable than steels of comparable strength, allowing their use in automotive exterior skin panels and structural reinforcements.

The manufacture of these sizable products normally requires considerable capital investment in stamping equipment and expensive tooling. For prototyping and limited run production, additive manufacturing can be a valuable tool to produce a multitude of designs without the need for expensive tooling and equipment.

Thus, there is a need in the art for alloy compositions for use in additive manufacturing.

SUMMARY

The present disclosure provides compositions comprising iron, about 0.01 to about 0.4% w/w of manganese; about 1.3 to about 1.9% w/w of chromium; about 0.1% w/w or less of nickel; about 1.2 to about 1.7% w/w of molybdenum; about 0.01 to about 0.4% w/w of niobium; about 0.01 to about 0.4% w/w of vanadium; about 1.5 to about 2% w/w of silicon; and about 0.01 to about 0.20% w/w of carbon.

The present disclosure also provides methods of preparing a metal powder, comprising atomizing a composition described herein.

The present disclosure further provides methods of preparing a metal object, comprising subjecting metal powder described herein to metal binder jetting.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific compositions and methods disclosed. In addition, the drawings are not necessarily drawn to scale.

FIG. 5A is a photograph showing the general microstructure. FIG. 5B is a photograph at a higher magnification identifying the bainite as well as the two type of ferrite dislocated (dark) and non-dislocated.

FIG. 7A is a micrograph/EDS of niobium carbide particles. FIG. 7B is a micrograph/EDS for molybdenum carbide particles.

DETAILED DESCRIPTION OF ILLUSTRATIVE EMBODIMENTS

Figure 1:
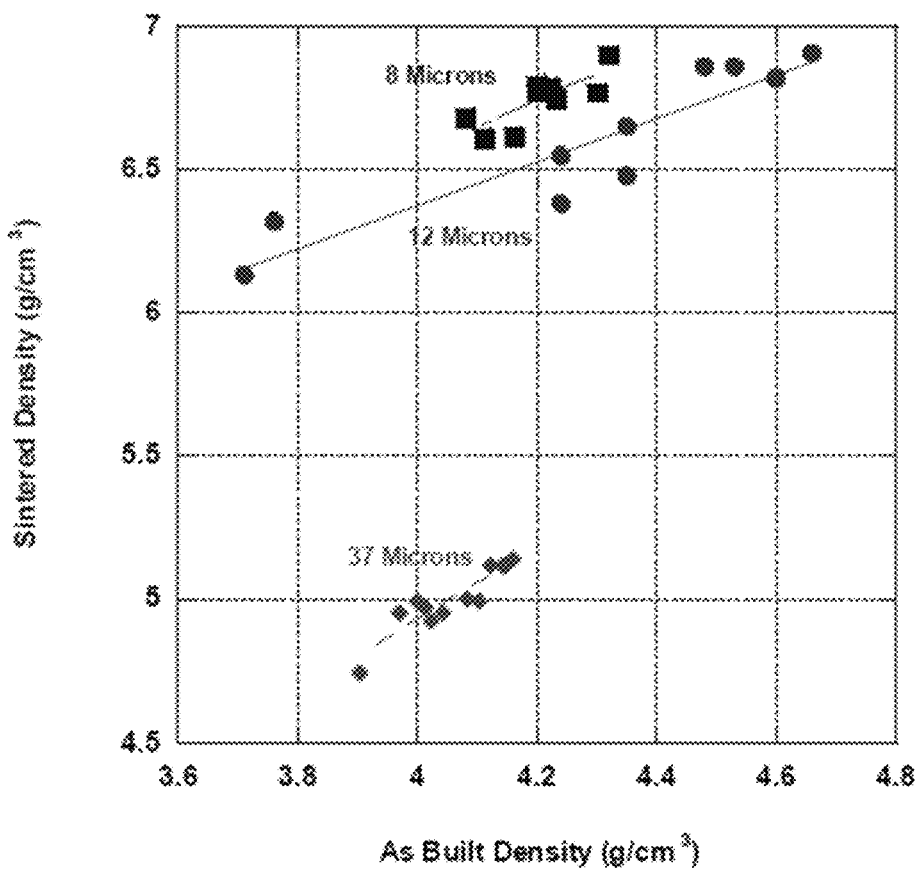
FIG. 1 is a dot plot of sintered density versus as built density as a function of mean particle size ($d_{50}$) for 316 L gas atomized stainless steel powder sintered at 1260° C. in 100% hydrogen.

In the present disclosure the singular forms "a", "an" and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about" it will be understood that the particular value forms another embodiment. In general, use of the term "about" indicates approximations that can vary depending on the desired properties sought to be obtained by the disclosed subject matter and is to be interpreted in the specific context in which it is used, based on its function. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Finally, while an embodiment may be described as part of a series of steps or part of a more general structure, each said step may also be considered an independent embodiment in itself.

As described herein, the disclosure provides metal compositions and metal powders that provide dual phase-low alloy steels. These steels exhibit enhanced diffusion at the sintering temperature leading to high densities. The alloy constituents are formulated, so that upon cooling from the sintering temperature, the transformation products allow the alloy to reach the desired mechanical properties. In particular, the microstructure of the alloy can be varied post-sintering, by heat treatment (i.e., different inter-critical annealing temperatures), to give a wide range of mechanical properties. For example, the metal compositions or metal powders are useful in metal binder jet technology to meet a targeted set of properties with the end goal to reach the performance of a competing technology (metal stamping) for an automotive application. Thus, the metal compositions exhibit a high degree of sinterability when compared to other low alloy steels used for metal binder jetting. Further, once sintered, the metal compositions provide metal parts with slightly lower ductility. By using metal binder jetting, it is possible to serially produce cost sensitive parts much faster than other additive manufacturing technologies, e.g., laser powder bed fusion.

Metal Compositions

The disclosure provides compositions comprising iron and additional components including manganese, chromium, nickel, molybdenum, niobium, vanadium, silicon, and carbon. Because iron forms the basis and major component of these compositions, these are "iron-based compositions. In some embodiments, the iron is the base element. The base-iron can be in the form of a powder or particles of pure iron, substantially pure iron, or iron pre-alloyed with at least one alloying element. In the iron-based powder compositions disclosed herein, the particles of iron or pre-alloyed iron are in combination with powders of the other alloying elements to provide a final metal composition.

"Pure iron" (or "pure iron particles") as used herein refers to iron containing no more than about 0.01% w/w of normal impurities. In order to provide the required iron content, elemental iron may be added to the metal compositions. In some embodiments, about 2 to about 7% w/w, based on the total weight of the composition, of elemental iron may be added. In other embodiments, about 2, about 2.5, about 3, about 3.5, about 4, about 4.5, about 5, about 5.5, about 6, about 6.5, or about 7, based on the total weight of the composition, of elemental iron may be added. In further embodiments, about 2 to about 6.5, about 2 to about 6, about 2 to about 5.5, about 2 to about 5, about 2 to about 4.5, about 2 to about 4, about 2 to about 3.5, about 2 to about 3, about 2 to about 2.5, about 2.5 to about 7, about 2.5 to about 6.5 m about 2.5 to about 6, about 2.5 to about 5.5, about 2.5 to about 5, about 2.5 to about 4.5, about 2.5 to about 4, about 2.5 to about 3.5, about 2.5 to about 3, about 3 to about 7, about 3 to about 6.5, about 3 to about 6, about 3 to about 5.5, about 3 to about 5, about 3 to about 4.5, about 3 to about 4, about 3 to about 3.5, about 3.5 to about 7, about 3.5 to about 6.5, about 3.5 to about 6, about 3.5 to about 5.5, about 3.5 to about 5, about 3.5 to about 4.5, about 3.5 to about 4, about 4 to about 7, about 4 to about 6.5, about 4 to about 6, about 4 to about 5.5, about 4 to about 5, about 4 to about 4.5, about 4.5 to about 7, about 4.5 to about 6.5, about 4.5 to about 6, about 4.5 to about 5.5, about 4.5 to about 5, about 5 to about 7, about 5 to about 6.5, about 5 to about 6, about 5 to about 5.5, about 5.5 to about 7, about 5.5 to about 6.5, about 6 to about 6, about 6 to about 6.5, or about 6.5 to 7% w/w, based on the total weight of the composition, of elemental iron may be added. In yet other embodiments, about 3 to about 5% w/w, based on the total weight of the composition, of elemental iron may be added.

"Substantially pure iron" (or "substantially pure iron particles") as used herein refers to iron containing no more than about 1.0% w/w, based on the total weight of the composition, preferably no more than about 0.5% w/w of normal impurities. Examples of substantially pure iron include highly compressible, metallurgical-grade iron powders. Specific examples of substantially pure iron powders include the ANCORSTEEL® 1000 series of pure iron powders, such as the following:

A composition comprising iron and less than about 0.01% w/w carbon, less about 0.14% w/w oxygen, about 0.002% w/w nitrogen, about 0.018% w/w sulfur, about 0.009% w/w phosphorus, less than about 0.01% w/w silicon, about 0.2% w/w manganese, about 0.07% w/w chromium, about 0.10% w/w copper, and about 0.08% w/w nickel (also known as ANCORSTEEL® 1000);

A composition comprising iron and less than about 0.01% w/w carbon, about 0.09% w/w oxygen, about 0.001% w/w nickel, about 0.009% w/w sulfur, about 0.005% w/w phosphorus, less than about 0.01% w/w silicon, about 0.10% w/w manganese, about 0.03% w/w chromium, about 0.05% w/w copper, and about 0.05% w/w nickel (also known as ANCORSTEEL® 1000B), A composition comprising iron and less than about 0.01% w/w carbon, about 0.07% w/w oxygen, about 0.001% w/w nitrogen, about 0.007% w/w sulfur, about 0.004% w/w phosphorus, less than about 0.01% w/w silicon, about 0.07% w/w manganese, about 0.02% w/w chromium, about 0.03% w/w copper, and about 0.04% w/w nickel (also known as ANCORSTEEL® 1000 C), A composition comprising iron and about 0.01% w/w carbon, about 0.02% w/w silicon, about 0.15% w/w oxygen, and about 0.015% w/w sulfur (also known as ANCORSTEEL® AMH), or A composition comprising iron and about 0.01% w/w carbon, about 0.02% w/w silicon, about 0.15% w/w oxygen, and about 0.015% w/w sulfur (also known as ANCORSTEEL® DWP200)

Other substantially pure iron powders that can be used herein include sponge iron powders, such as a composition comprising iron and about 0.02% w/w silicon dioxide, about 0.01% w/w carbon, about 0.009% w/w sulfur, and about 0.01% w/w phosphorus (also known as ANCOR MH-100 powder).

The ANCORSTEEL® low alloy steel powders are substantially pure iron and contain a low level of alloy components. Such low alloy steel powders include, without limitation, the following:

A composition comprising iron and less than about 0.01% w/w carbon, about 0.35% w/w molybdenum, about 0.15% w/w manganese, and about 0.13% w/w oxygen (also known as ANCORSTEEL® 30HP), A composition comprising iron and less than about 0.01% w/w carbon, about 0.18% w/w manganese, about 0.50% w/w molybdenum, about 0.09% w/w oxygen (also known as ANCORSTEEL® 50 HP), A composition comprising iron and less than about 0.01% w/w carbon, about 0.12% w/w manganese, about 0.86% w/w of molybdenum, and about 0.08% w/w oxygen (also known as ANCORSTEEL® 85 HP), A composition comprising iron and less than about 0.01% w/w carbon, about 0.12% w/w manganese, about 1.5% w/w molybdenum, and about 0.08% w/w oxygen (also known as ANCORSTEEL® 150 HP), Overall, regardless of the source of the iron, the compositions contain an amount of iron that results in an 100% w/w based on the % w/w of the other components of the composition. In other words, the amount of the iron and other components of the composition adds up to 100% w/w. In some embodiments, the compositions contain about 85 to about 96% w/w of iron. In other embodiments, the compositions contain about 85, about 86, about 87, about 88, about 89, about 90, about 91, about 92, about 93, about 94, about 95, or about 96% w/w of iron. In further embodiments, the compositions contain about 85 to about 96, about 85 to about 95, about 85 to about 94, about 85 to about 93, about 85 to about 92, about 85 to about 91, about 85 to about 90, about 85 to about 89, about 85 to about 88, about 85 to about 87, about 85 to about 86, about 86 to about 96, about 86 to about 95, about 86, about 94, about 86 to about 93, about 86 to about 92, about 86 to about 91, about 86 to about 90, about 86 to about 89, about 86 to about 88, about 86 to about 87, about 87 to about 96, about 87 to about 95, about 87 to about 94, about 87 to about 93, about 87 to about 92, about 87 to about 91, about 87 to about 90, about 87 to about 89, about 87 to about 88, about 88 to about 96, about 88 to about 95, about 88 to about 94, about 88 to about 93, about 88 to about 92, about 88 to about 91, about 88 to about 90, about 88 to about 89, about 89 to about 96, about 89 to about 95, about 89 to about 94 m about 89 to about 93, about 89 to about 92, about 89 to about 91, about 89 to about 90, about 90 to about 96, about 90 to about 95, about 90 to about 94, about 90 to about 93, about 90 to about 92, about 90 to about 91, about 91 to about 96, about 91 to about 95, about 91 to about 94, about 91 to about 93, about 91 to about 92, about 92 to about 96, about 92 to about 95, about 92 to about 94, about 92 to about 93, about 93 to about 96, about 93 to about 95, about 93 to about 94, about 94 to about 96, about 94 to about 95, or about 95 to about 96% w/w of iron. In further embodiments, the compounds contain about 94 to about 96% w/w of iron. In yet other embodiments, the compositions contain about 94.1 to about 95.4% w/w of iron. In still further embodiments, the compositions contain about 94.11 to about 95.44% w/w of iron.

As previously noted, the compositions contain additional components. These components are balanced in the composition so as to provide a dual phase microstructure. In some embodiments, the elements which form austenite (e.g., carbon, copper, nickel) are balanced with those that form ferrite (e.g., chromium, molybdenum, silicon, etc.) in an alloy to form a dual phase microstructure. In addition to aiding in forming the desired microstructure, the additional elements contribute to formed transformation products (e.g., bainite and martensite) when the alloy is cooled. These transformation products lead to an increase in the work hardening rate and a sintered metal product having a high strength (e.g., high ultimate tensile strength) and high ductility.

In some embodiments, the compositions comprise about 0.01 to about 0.4% w/w of manganese. In certain aspects, the compositions comprise about 0.01, about 0.01, about 0.02, about 0.03, about 0.04, about 0.05, about 0.06, about 0.07, about 0.08, about 0.09, about 0.1, about 0.11, about 0.12, about 0.13, about 0.14, about 0.15, about 0.16, about 0.17, about 0.18, about 0.19, about 0.20, about 0.21, about 0.22, about 0.23, about 0.24, about 0.25, about 0.26, about 0.27, about 0.28, about 0.29, about 0.30, about 0.31, about 0.32, about 0.33, about 0.34, about 0.35, about 0.36, about 0.37, about 0.38, about 0.39, or about 0.4% w/w of manganese. In other aspects, the compositions contain about 0.1 to about 0.35, about 0.1 to about 0.3, about 0.1 to about 0.25, about 0.1 to about 0.2, about 0.1 to about 0.15, about 0.25 to about 0.4, about 0.25 to about 0.35, about 0.25 to about 0.3, or about 0.3 to about 0.4% w/w of manganese. In further aspects, the compositions contain about 0.1 to about 0.3% w/w of manganese. In other aspects, the compositions contain about 0.15 to about 0.25% w/w of manganese. In still further aspects, the compositions contain about 0.2% w/w of manganese.

In other embodiments, the compositions contain about 1.3 to about 1.9% w/w of chromium. In certain aspects, the compositions contain about 1.3, about 1.4, about 1.5, about 1.6, about 1.7, about 1.8, or about 1.9% w/w of chromium. In other aspects, the compositions contain about 1.3 to about 1.8, about 1.3 to about 1.7, about 1.3 to about 1.6, about 1.3 to about 1.5, about 1.3 to about 1.4, about 1.4 to about 1.9, about 1.4 to about 1.8, about 1.4 to about 1.7, about 1.4 to about 1.6, about 1.4 to about 1.5, about 1.5 to about 1.9, about 1.5 to about 1.8, about 1.5 to about 1.7, about 1.5 to about 1.6, about 1.6 to about 1.9, about 1.6 to about 1.8, about 1.6 to about 1.7, about 1.7 to about 1.9, about 1.7 to about 1.8, or about 1.8 to about 1.9% w/w of chromium. In other aspects, the compositions contain about 1.4 to about 1.8% w/w of chromium. In further aspects, the compositions contain about 1.5 to about 1.7% w/w of chromium. In still other aspects, the compositions contain about 1.55 to about 1.65% w/w of chromium. In yet further aspects, the compositions contain about 1.6% w/w of chromium.

In further embodiments, the compositions lack nickel, i.e., contain 0% w/w of nickel. In doing so, the compositions have fewer health and safety concerns.

The compositions may alternatively contain nickel. In yet other embodiments, the compositions contain about 0.1% w/w or less of nickel. Thus, in certain aspects, the compositions contain about 0.09, about 0.08, about 0.07, about 0.06, about 0.05, about 0.04, about 0.03, about 0.02, or about 0.01% w/w or less of nickel.

In still further embodiments, the compositions contain about 0.04 to about 0.1% of nickel. In certain aspects, the compositions contain about 0.04, about 0.05, about 0.06, about 0.07, about 0.08, about 0.09, or about 0.1% w/w of nickel. In other aspects, the compositions contain about 0.04 to about 0.1, about 0.04 to about 0.09, about 0.04 to about 0.08, about 0.04 to about 0.07, about 0.04 to about 0.06, about 0.04 to about 0.05, about 0.05 to about 0.1, about 0.05 to about 0.09, about 0.05 to about 0.08, about 0.05 to about 0.07, about 0.05 to about 0.06, about 0.06 to about 0.1, about 0.06 to about 0.09, about 0.06 to about 0.08, about 0.06 to about 0.07, about 0.07 to about 0.1, about 0.07 to about 0.09, about 0.07 to about 0.08, about 0.08 to about 0.1, about 0.08 to about 0.09, or about 0.09 to about 0.1% w/w of nickel. In further aspects, the compositions contain about 0.05 to about 0.07% w/w of nickel. In still other aspects, the compositions contain about 0.05% w/w of nickel. In yet further aspects, the compositions contain about 0.1% w/w of nickel.

The compositions also contain molybdenum. Among other reasons, the molybdenum rich carbides that are formed provide additional strengthening while limiting grain growth during heat treatment. In other embodiments, the compositions contain about 1.2 to about 1.7% w/w of molybdenum. In certain aspects, the compositions contain about 1.2, about 1.3, about 1.4, about 1.5, about 1.6, or about 1.7% w/w of molybdenum. In other aspects, the compositions contain about 1.2 to about 1.7, about 1.2 to about 1.6, about 1.2 to about 1.5, about 1.2 to about 1.4, about 1.2 to about 1.3, about 1.3 to about 1.7, about 1.3 to about 1.6, about 1.3 to about 1.5, about 1.3 to about 1.4, about 1.4 to about 1.7, about 1.4 to about 1.6, about 1.4 to about 1.5, about 1.5 to about 1.7, about 1.5 to about 1.6, or about 1.6 to about 1.7% w/w of molybdenum. In further aspects, the compositions contain about 1.3 to about 1.6% w/w of molybdenum. In yet other aspects, the compositions contain about 1.4 to about 1.5% w/w of molybdenum. In still further aspects, the compositions contain about 1.45% w/w of molybdenum. In other aspects, the compositions contains about 1.5% w/w of molybdenum.

The compositions further contain niobium. Among other reasons, the niobium adds to providing the two-phases of austenite and ferrite, thereby permitting higher carbon levels to be utilized. Further, the niobium rich carbides that are formed provide additional strengthening while limiting grain growth during heat treatment. In some embodiments, the compositions comprise about 0.01 to about 0.4% w/w of niobium. In certain aspects, the compositions comprise about 0.01, about 0.01, about 0.02, about 0.03, about 0.04, about 0.05, about 0.06, about 0.07, about 0.08, about 0.09, about 0.1, about 0.11, about 0.12, about 0.13, about 0.14, about 0.15, about 0.16, about 0.17, about 0.18, about 0.19, about 0.20, about 0.21, about 0.22, about 0.23, about 0.24, about 0.25, about 0.26, about 0.27, about 0.28, about 0.29, about 0.30, about 0.31, about 0.32, about 0.33, about 0.34, about 0.35, about 0.36, about 0.37, about 0.38, about 0.39, or about 0.4% w/w of niobium. In other aspects, the compositions contain about 0.1 to about 0.35, about 0.1 to about 0.3, about 0.1 to about 0.25, about 0.1 to about 0.2, about 0.1 to about 0.15, about 0.25 to about 0.4, about 0.25 to about 0.35, about 0.25 to about 0.3, or about 0.3 to about 0.4% w/w of niobium. In further aspects, the compositions contain about 0.1 to about 0.3% w/w of niobium. In other aspects, the compositions contain about 0.15 to about 0.2% w/w of niobium. In still further aspects, the compositions contain about 0.18% w/w of niobium.

The compositions also contain vanadium. Among other reasons, the vanadium, alone or in combination with the niobium, adds to providing the two-phases of austenite and ferrite, thereby permitting higher carbon levels to be utilized. Further, the vanadium rich carbides that are formed provide additional strengthening. In some embodiments, the compositions comprise about 0.01 to about 0.4% w/w of vanadium. In certain aspects, the compositions comprise about 0.01, about 0.01, about 0.02, about 0.03, about 0.04, about 0.05, about 0.06, about 0.07, about 0.08, about 0.09, about 0.1, about 0.11, about 0.12, about 0.13, about 0.14, about 0.15, about 0.16, about 0.17, about 0.18, about 0.19, about 0.20, about 0.21, about 0.22, about 0.23, about 0.24, about 0.25, about 0.26, about 0.27, about 0.28, about 0.29, about 0.30, about 0.31, about 0.32, about 0.33, about 0.34, about 0.35, about 0.36, about 0.37, about 0.38, about 0.39, or about 0.4% w/w of vanadium. In other aspects, the compositions contain about 0.1 to about 0.35, about 0.1 to about 0.3, about 0.1 to about 0.25, about 0.1 to about 0.2, about 0.1 to about 0.15, about 0.25 to about 0.4, about 0.25 to about 0.35, about 0.25 to about 0.3, or about 0.3 to about 0.4% w/w of vanadium. In further aspects, the compositions contain about 0.1 to about 0.3% w/w of vanadium. In other aspects, the compositions contain about 0.15 to about 0.2% w/w of vanadium. In still further aspects, the compositions contain about 0.18% w/w of vanadium.

The compositions further contain silicon. In some embodiments, the compositions contain about 1.5 to about 2% w/w of silicon. In certain aspects, the compositions contain about 1.5 to about 2, about 1.5 to about 1.9, about 1.5 to about 1.8, about 1.5 to about 1.7, about 1.5 to about 1.6, about 1.6 to about 2, about 1.6 to about 1.9, about 1.6 to about 1.8, about 1.6 to about 1.7, about 1.7 to about 2, about 1.7 to about 1.9, about 1.7 to about 1.8, about 1.8 to about 2, about 1.8 to about 1.9, or about 1.9 to about 2% w/w of silicon. In other aspects, the compositions contain about 1.5 to about 1.8% w/w of silicon. In further aspects, the compositions contain about 1.5 to about 1.7% w/w of silicon In yet other aspects, the compositions contain about 1.6 to about 1.7% w/w of silicon. In still further aspects, the compositions contain about 1.6% w/w of silicon.

The compositions of the disclosure also contain carbon. Given the low amounts of carbon, the metal compositions are more conducive to welding. In some embodiments, the compositions contain about 0.01 to about 0.20% w/w of carbon. In certain aspects, the compositions contain about 0.01, 0.02, 0.03, 0.04, 0.05, 0.06, 0.07, 0.08, 0.09, 0.1, 0.11, about 0.12, about 0.13, about 0.14, about 0.15, about 0.16, about 0.17, about 0.18, about 0.19, or about 0.2% w/w of carbon. In other aspects, the compositions contain about 0.05 to about 0.14% w/w of carbon. In further aspects, the compositions contain about 0.1 to about 0.14% w/w of carbon. In still other aspects, the compositions contain about 0.14% w/w of carbon. In yet further aspects, the compositions contain less than about 0.16 w/w of carbon.

The compositions of the disclosure optionally contain additional components, such as sulfur, oxygen, or nitrogen, or combinations thereof. Such components typically are present in the iron powder that is incorporated into the compositions of the disclosure. In one example, the compositions contain sulfur. In some embodiments, the compositions contain about 0.001 to about 0.015% w/w of sulfur. In certain aspects, the compositions contain about 0.001, about 0.002, about 0.003, about 0.004, about 0.005, about 0.006, about 0.007, about 0.008, about 0.009, about 0.01, about 0.011, about 0.012, about 0.013, about 0.014, or about 0.015% w/w of sulfur. In other aspects, the compositions contain about 0.001 to about 0.015, about 0.001 to about 0.014, about 0.001 to about 0.013, about 0.001 to about 0.012, about 0.001 to about 0.011, about 0.001 to about 0.01, about 0.001 to about 0.009, about 0.001 to about 0.008, about 0.001 to about 0.007, about 0.001 to about 0.006, about 0.001 to about 0.005, about 0.001 to about 0.004, about 0.001 to about 0.003, about 0.001 to about 0.002, about 0.0025 to about 0.015, about 0.0025 to about 0.014, about 0.0025 to about 0.013, about 0.0025 to about 0.012, about 0.0025 to about 0.011, about 0.0025 to about 0.01, about 0.0025 to about 0.009, about 0.0025 to about 0.008, about 0.0025 to about 0.007, about 0.0025 to about 0.006, about 0.0025 to about 0.005, about 0.0025 to about 0.004, about 0.0025 to about 0.003, about 0.005 to about 0.015, about 0.005 to about 0.014, about 0.005 to about 0.013, about 0.005 to about 0.012, about 0.005 to about 0.011, about 0.005 to about 0.01, about 0.005 to about 0.009, about 0.005 to about 0.008, about 0.005 to about 0.007, about 0.005 to about 0.006, about 0.0075 to about 0.005, about 0.0075 to about 0.004, about 0.0075 to about 0.015, about 0.0075 to about 0.014, about 0.0075 to about 0.013, about 0.0075 to about 0.012, about 0.0075 to about 0.011, about 0.0075 to about 0.01, about 0.01 to about 0.015, about 0.01 to about 0.014, about 0.01 to about 0.013, about 0.01 to about 0.012, about 0.01 to about 0.011, about 0.0125 to about 0.015, about 0.0125 to about 0.014, or about 0.0125 to about 0.013% w/w of sulfur. In further aspects, the compositions contain about 0.005 to about 0.01% w/w of sulfur. In yet other aspects, the compositions contain about 0.006 to about 0.008% w/w of sulfur. In still further aspects, the compositions contain about 0.007% w/w of sulfur.

In another example, the compositions of the disclosure contain oxygen. In some embodiments, the compositions contain about 0.01 to about 0.1% w/w of oxygen. In certain aspects, the compositions contain about 0.01, about 0.02, about 0.03, about 0.04, about 0.05, about 0.06, about 0.07, about 0.08, about 0.09, or about 0.1% w/w of oxygen. In other aspects, the compositions contain about 0.01 to about 0.09, about 0.01 to about 0.08, about 0.01 to about 0.07, about 0.01 to about 0.06, about 0.01 to about 0.05, about 0.01 to about 0.04, about 0.01 to about 0.03, about 0.01 to about 0.02, about 0.02 to about 0.1, about 0.02 to about 0.09, about 0.02 to about 0.08, about 0.02 to about 0.07, about 0.02 to about 0.06, about 0.02 to about 0.05, about 0.02 to about 0.04, about 0.02 to about 0.03, about 0.03 to about 0.1, about 0.03 to about 0.09, about 0.03 to about 0.08, about 0.03 to about 0.07 ,k about 0.03 to about 0.06, about 0.03 to about 0.05, about 0.03 to about 0.04, about 0.04 to 'about 0.1, about 0.04 to about 0.09, about 0.04 to about 0.08, about 0.04 to about 0.07, about 0.04 to about 0.06, about 0.04 to about 0.05, about 0.05 to about 0.1, about 0.05 to about 0.09, about 0.05 to about 0.08, about 0.05 to about 0.07, about 0.05 to about 0.06, about 0.06 to about 0.1, about 0.06 to about 0.09, about 0.06 to about 0.08, about 0.06 to about 0.07, about 0.07 to about 0.1, about 0.07 to about 0.09, about 0.07 to about 0.08, about 0.08 to about 0.1, about 0.08 to about 0.09, or about 0.09 to about 0.1% w/w of oxygen. In further aspects, the compositions contain about 0.04 to about 0.08% w/w of oxygen. In yet other aspects, the compositions contain about 0.05 to about 0.07% w/w of oxygen. In still further aspects, the compositions contain about 0.06% w/w of sulfur.

In a further example, the compositions contain about 0.01 to about 0.02% of nitrogen. In certain aspects, the compositions contain about 0.011, about 0.012, about 0.013, about 0.014, about 0.015, about 0.016, about 0.017, about 0.018, about 0.019, or about 0.2% w/w of nitrogen. In some aspects, the compositions contain about 0.011 to about 0.019, about 0.011 to about 0.018, about 0.011 to about 0.017, about 0.011 to about 0.016, about 0.011 to about 0.015, about 0.011 to about 0.014, about 0.011 to about 0.013, about 0.011 to about 0.012, about 0.012 to about 0.02, about 0.012 to about 0.019, about 0.012 to about 0.018, about 0.012 to about 0.017, about 0.012 to about 0.016, about 0.012 to about 0.015, about 0.012 to about 0.014, about 0.012 to about 0.013, about 0.013 to about 0.02, about 0.013 to about 0.019, about 0.013 to about 0.018, about 0.013 to about 0.017, about 0.013 to about 0.016, about 0.013 to about 0.015, about 0.013 to about 0.014, about 0.014 to about 0.02, about 0.014 to about 0.019, about 0.014 to about 0.018, about 0.014 to about 0.017, about 0.014 to about 0.016, about 0.014 to about 0.015, about 0.015 to about 0.02, about 0.015 to about 0.019, about 0.015 to about 0.018, about 0.015 to about 0.017, about 0.015 to about 0.016, about 0.016 to about 0.2, about 0.016 to about 0.019, about 0.016 to about 0.018, about 0.016 to about 0.017, about 0.017 to about 0.02, about 0.017 to about 0.019, about 0.017 to about 0.018, about 0.018 to about 0.02, about 0.018 to about 0.019, or about 0.019 to about 0.02% w/w of nitrogen. In further aspects, the compositions contain about 0.005 to about 0.015% w/w of nitrogen. In other aspects, the compositions contain about 0.01% w/w of nitrogen.

Methods for Preparing the Metal Powders

The metal compositions as described herein may be utilized to prepare metal powders for use in the processes described below. In some embodiments, the metal powders are prepared by atomizing the metal compositions described herein. For example, the metal compositions are gas atomized or water atomized to provide metal powders. In certain aspects, the metal compositions are gas atomized. In other aspects, the metal compositions are water atomized.

The metal powders of the disclosure are fine powders, i.e., have low mean particle sizes. Doing so provides high densities of the metal object and high surface quality. In some embodiments, the surface quality of the metal object is about 20% better than a similar object prepared using laser powder bed fusion. The low mean particle size of the metal powder may be measured by the $d_{10}$, $d_{50}$, and/or $d_{90}$ values.

The metal powders may have a $d_{10}$ particle size of about 1 to about 10μ. In some aspects, the compositions have a $d_{10}$ particle size of about 1, about 2, about 3, about 4, about 5, about 6, about 7, about 8, about 9, or about 10μ. In other aspects, the metal powders have a $d_{10}$ particle size of about 1 to about 10μ, about 1 to about 9, about 1 to about 8, about 1 to about 7, about 1 to about 6, about 1 to about 5, about 1 to about 4, about 1 to about 3, about 1 to about 2, about 2 to about 10, about 2 to about 9, about 2 to about 8, about 2 to about 7, about 2 to about 6, about 2 to about 5, about 2 to about 4, about 2 to about 3, about 3 to about 10, about 3 to about 9, about 3 to about 8, about 3 to about 7, about 3 to about 6, about 3 to about 5, about 3 to about 4, about 4 to about 10, about 4 to about 9, about 4 to about 8, about 4 to about 7, about 4 to about 6, about 4 to about 5, about 5 to about 10, about 5 to about 9, about 5 to about 8, about 5 to about 7, about 5 to about 6, about 6 to about 10, about 6 to about 9, about 6 to about 8, about 6 to about 7, about 7 to about 10, about 7 to about 9, about 7 to about 8, about 8 to about 10, about 8 to about 9, or about 9 to about 10μ.

The metal powders, alternatively or in addition to the $d_{10}$ particle size, have a $d_{50}$ particle size of about 10 to about 20μ. In certain aspects, the metal powders have a $d_{50}$ particle size of about 10, about 11, about 12, about 13, about 14, about 15, about 16, about 17, about 18, about 19, or about 20μ. In other aspects, the compositions have a $d_{50}$ particle size of about 10 to about 19, about 10 to about 18, about 10 to about 17, about 10 to about 16, about 10 to about 15, about 10 to about 14, about 10 to about 13, about 10 to about 12, about 10 to about 11, about 11 to about 20, about 11 to about 19, about 11 to about 18, about 11 to about 17, about 11 to about 16, about 11 to about 15, about 11 to about 14, about 11 to about 13, about 11 to about 12, about 12 to about 20, about 12 to about 19, about 12 to about 18, about 12 to about 17, about 12 to about 16, about 12 to about 15, about 12 to about 14, about 12 to about 13, about 13 to about 20, about 13 to about 19, about 13 to about 18, about 13 to about 17, about 13 to about 16, about 13 to about 15, about 13 to about 14, about 14 to about 20, about 14 to about 19, about 14 to about 18, about 14 to about 17, about 14 to about 16, about 14 to about 15, about 15 to about 20, about 15 to about 19, about 15 to about 18, about 15 to about 17, about 15 to about 16, about 16 to about 20, about 16 to about 19, about 16 to about 18, about 16 to about 17, about 17 to about 20, about 17 to about 19, about 17 to about 18, about 18 to about 20, about 18 to about 19, or about 19 to about 20μ.

The metal powders, alternatively or in addition to the $d_{10}$ and/or $d_{50}$ particle size, have a $d_{90}$ particle size of about 20 to about 30μ. In certain aspects, the metal powders have a $d_{50}$ particle size of about 20, about 21, about 22, about 23, about 24, about 25, about 26, about 27, about 28, about 29, or about 30μ. In other aspects, the compositions have a $d_{50}$ particle size of about 20 to about 29, about 20 to about 28, about 20 to about 27, about 20 to about 26, about 20 to about 25, about 20 to about 24, about 20 to about 23, about 20 to about 22, about 20 to about 21, about 21 to about 30, about 21 to about 29, about 21 to about 28, about 21 to about 27, about 21 to about 26, about 21 to about 25, about 21 to about 24, about 21 to about 23, about 21 to about 22, about 22 to about 30, about 22 to about 29, about 22 to about 28, about 22 to about 27, about 22 to about 26, about 22 to about 25, about 22 to about 24, about 22 to about 23, about 23 to about 30, about 23 to about 29, about 23 to about 28, about 23 to about 27, about 23 to about 26, about 23 to about 25, about 23 to about 24, about 24 to about 30, about 24 to about 29, about 24 to about 28, about 24 to about 27, about 24 to about 26, about 24 to about 25, about 25 to about 30, about 25 to about 29, about 25 to about 28, about 25 to about 27, about 25 to about 26, about 26 to about 30, about 26 to about 29, about 26 to about 28, about 26 to about 27, about 27 to about 30, about 27 to about 29, about 27 to about 28, about 28 to about 30, about 28 to about 29, or about 29 to about 30μ.

The compositions described herein may also be combined with excipients that are useful in preparing the metal objects (e.g., green, sintered, and/or annealed). In some embodiments, the excipient is a lubricant or a binder. Lubricants and binding agents that can be used as described herein are those commonly employed by the powder metallurgy industry. See, e.g., the lubricants described in U.S. Pat. Nos. 4,834, 800; 4,483,905; 5,298,055; 5,368,630; 5,498,276; 5,330, 792; 6,602,315; 5,290,336, the disclosures of which are each hereby incorporated by reference in their entireties. In other embodiments, the excipient is graphite, stearates (such as zinc stearate, lithium stearate, manganese stearate, and calcium stearate), zinc phosphate, boric acid, acetic acid, phosphoric acid, citric acid. amide lubricants (such as ethylene bis-stearamides), polysilazanes, polyureasilazanes, polythioureasilazanes, polycarbosilanes, polysilanes, polysiloxanes, polyborosilazanes, polyaminosilazanes, polyaminoboranes, polyalazanes, polyborazanes, polyphosphazenes, polyphosphinoboranes), polyglycols (such as polyethylene glycol or polypropylene glycol), glycerin, polyvinyl alcohol, homopolymers or copolymers of vinyl acetate, cellulosic ester or ether resins, methacrylate polymers or copolymers, alkyl resins, polyurethane resins, polyester resins, dibasic organic acids (such as azelaic acid), polyethers (liquid or solid), acrylic resins, cellulose ester resins, hydroxy alkylcellulose resins, thermoplastic phenolic resins, polyvinyl pyrrolidone, polyethylene oxide, low melting, solid polymers or waxes (such as a polymer or wax having a softening temperature of below 200° C., e.g., polyesters, polyethylenes, epoxies, urethanes, paraffins, ethylene bis-stearamides, or cotton seed waxes) including paraffin waxes, polyolefins, hydrogenated vegetable oils that are $C_{14-24}$ alkyl moiety triglycerides and derivatives thereof, including hydrogenated derivatives (such as cottonseed oil, soybean oil, jojoba oil, or blends thereof), polyvinyl acetate, polyethylene, cellulose ester, or polyvinylpyrrolidone. In certain embodiments, the excipient is polyethylene, ethylene bis-stearamide, a paraffin wax, or polyvinyl acetate, or a combination thereof.

Within the scope of the disclosure, the components of the metallurgical powder compositions can be added together, combined, and/or bonded in any order.

Methods of Using the Metal Compositions/Powders

The compositions and powders described herein are useful in a variety of applications. In some embodiments, the disclosure provides methods of preparing metal objects using these compositions and powders. The desired shape and type of the metal object may be determined by one skilled in the art. In certain embodiments, the metal object is a billet, bar, rod, wire, strip, plate, or sheet. In some embodiments, the metal object is an automotive part. In other embodiments, the metal object is sheet material for an automotive part. In further embodiments, the metal object is sheet material for body automotive parts. In yet other embodiments, the metal object is sheet material for chassis automotive parts.

The methods include subjecting the metal compositions or powders to metal binder jetting. One of skill in the art would understand the steps performed in metal binder jetting.

In summary, metal binder jetting includes depositing the composition or powder onto a substrate in layers. The substrate does not form part of the desired metal object product, but instead is a medium designed to support the final metal object. One of skill in the art would be able to determine the type of substrate and number of layers desired to produce the desired metal object. In some embodiments, there are two or more layers of the metal composition or powder.

Each layer of the metal composition or powder are held or bound together using a liquid binding agent. In some embodiments, the liquid binding agent is a polymer. In other embodiments, the liquid binding agent is a polymeric glue. One skilled in the art would be able to select a suitable polymeric glue depending on the metal object to be prepared. In some aspects, the polymeric glue is polyethylene, ethylene bis-stearamide, or other waxes, among others. The liquid binding agent may be applied to each layer of the metal powder using a print head. One skilled in the art would be able to select a suitable print head, depending on factors such as the desired metal object, metal composition or powder, among others. The liquid binding agent is applied at a thickness as needed by the desired metal object. In some embodiment, the binding agent is applied at a thickness of about 1 to about 100 microns. In further embodiments, the binding agent is applied at a thickness of about 1, about 5, about 10, about 20, about 30, about 40, about 50, about 60, about 70, about 80, about 90, or about 100 microns. In still other embodiments, the binding about is applied at a thickness of about 1 to about 90, about 1 to about 80, about 1 to about 70, about 1 to about 60, about 1 to about 50, about 1 to about 40, about 1 to about 30, about 1 to about 20, about 1 to about 10, about 10 to about 100, about 10 to about 90, about 10 to about 80, about 10 to about 70, about 10 to about 60, about 10 to about 50, about 10 to about 40, about 10 to about 30, about 10 to about 20, about 20 to about 100, about 20 to about 90, about 20 to about 80, about 20 to about 70, about 20 to about 60, about 20 to about 50, about 20 to about 40, about 20 to about 30, about 40 to about 100, about 30 to about 90, about 30 to about 80, about 30 to about 70, about 30 to about 60, about 30 to about 50, about 30 to about 40, about 40 to about 100, about 40 to about 90, about 40 to about 80, about 40 to about 70, about 40 to about 60, about 40 to about 50, about 50 to about 100, about 50 to about 90, about 50 to about 80, about 50 to about 70, about 50 to about 60, about 60 to about 100, about 60 to about 90, about 60 to about 80, about 60 to about 70, about 70 to about 100, about 70 to about 90, about 70 to about 80, about 80 to about 100, about 80 to about 90, or about 90 to about 100 microns. In yet further embodiments, the binding agent is applied at a thickness of about 50 microns.

Once the metal object is prepared using the metal binder jetting, the metal object is sintered. Doing so provides the desired shape and/or density of the metal object. One of skill in the art would be able to determine suitable sintering conditions, including temperatures, among others. In some embodiments, the metal object is sintered at a temperature that provides a crystal structure of the metal object that is body centered cubic (BCC) ferrite. In other embodiments, the metal object is sintered at a temperature that provides a crystal structure of the metal object that is face centered cubic austenite (FCC). In further embodiments, the metal object is sintered at a temperature that provides a crystal structure of the metal object that is BCC and FCC. In yet other embodiments, the sintered metal object comprises an about 1:1 ratio of BCC to face centered cubic austenite (FCC). In still further embodiments, the metal object comprises about 10 to about 50% w/w, based on the weight of the metal object, of BCC. In certain embodiments, the metal object comprises about 10, about 20, about 30, about 40, or about 50% w/w, based on the weight of the metal object, of BCC. In further aspects, the metal object comprise about 10 to about 40, about 10 to about 30, about 10 to about 20, about 20 to about 50, about 20 to about 40, about 20 to about 30, about 30 to about 50, about 30 to about 40, or about 40 to about 50% w/w, based on the weight of the metal object, of BCC. In other embodiments, the metal object comprises about 10% to about 50% w/w, based on the weight of the metal object, of FCC. In certain embodiments, the metal object comprises about 10, about 20, about 30, about 40, or about 50% w/w, based on the weight of the metal object, of VCC. In further aspects, the metal object comprise about 10 to about 40, about 10 to about 30, about 10 to about 20, about 20 to about 50, about 20 to about 40, about 20 to about 30, about 30 to about 50, about 30 to about 40, or about 40 to about 50% w/w, based on the weight of the metal object, of FCC. In still further embodiments, the sintering temperature is about 700 to about 1500° C. In other embodiments, the sintering temperature is about 700, about 750, about 800, about 850, about 900, about 950, about 1000, about 1050, about 1100, about 1150, about 1200, 1250, about 1300, about 1350, about 1400, 1450, or about 1500° C. In further embodiments, the sintering temperature is about 700 to about 1400, about 700 to about 1300, about 700 to about 1200, about 700 to about 1100, about 700 to about 1000, about 700 to about 900, about 700 to about 800, about 800 to about 1500, about 800 to about 1400, about 800 to about 1300, about 800 to about 1200, about 800 to about 1100, about 800 to about 1000, about 800 to about 900, about 900 to about 1500, about 900 to about 1400, about 900 to about 1300, about 900 to about 1200, about 900 to about 1100, about 900 to about 1000, about 1000 to about 1500, about 1000 to about 1400, about 1000 to about 1300, about 1000 to about 1200, about 1000 to about 1100, about 1100 to about 1500, about 1100 to about 1400, about 1100 to about 1300, about 1100 to about 1200, about 1200 to about 1500, about 1200 to about 1400, about 1200 to about 1300, about 1300 to about 1500, about 1300 to about 1400, or about 1400 to about 1500° C. In yet other embodiments, the sintering temperature is about 1200 to about 1380° C.

After sintering, the sintered metal object has a high density. In some embodiments, the density of the sintered metal object is at least about 7.2 g/cm³. In other embodiments, the density of the sintered metal object is about 7.2 to about 7.8. In further embodiments, the density of the sintered metal object is about 7.2, about 7.3, about 7.4, about 7.5, about 7.6, about 7.7, or about 7.8 g/cm³. In yet other embodiments, the density of the sintered metal object is about 7.2 to about 7.7 ,k about 7.2 to about 7.6, about 7.2 to about 7.5, about 7.2 to about 7.4, about 7.2 to about 7.3, about 7.3 to about 7.8, about 7.3 to about 7.7, about 7.3 to about 7.6, about 7.3 to about 7.5, about 7.3 to about 7.4, about 7.4 to about 7.8, about 7.4 to about 7.7, about 7.4 to about 7.6, about 7.4 to about 7.5, about 7.5 to about 7.8, about 7.5 to about 7.7, about 7.5 to about 7.6, about 7.6 to about 7.8, about 7.6 to about 7.7, or about 7.7 to about 7.8 g/cm³.

The sintered metal object may then be subjected to additional steps including, without limitation, annealing. One of the advantages of the metal compositions or powders of the disclosure is their ability to produce a metal object that has a dual-phase. Thus, the metal object can be intercritically annealed at temperatures which vary the level of austenite and ferrite. Therefore, heat treatments can be developed to produce a range of properties with the same alloy. For example, if a material with a higher strength is desired, an intercritical anneal temperature at which a higher level of austenite exists can be designed and then a cooling rate can be utilized so that a higher level of martensite/bainite is produced, resulting in higher strengths. In another example, if a more ductile material is desired, the intercritical annealing temperature is utilized to provide a higher level of ferrite, thereby providing a metal object with lower strength but higher elongation. In a further example, if steel having an optimum level of strength and ductility is desired, the cooling rate is adjusted. In doing so, the cooling rate permits and appropriate microstructure to form. It is an advantage of the disclosure that the metal powder for use metal binder jetting can be prepared to meet a range of properties.

In order to provide desirable mechanical properties, the metal objects prepared herein have optimized ultimate tensile strength, ductility, or a combination thereof. This can be accomplished being adjusting the bainite amounts, martensite amounts, or a combination thereof. In certain embodiments, the amount of bainite in the metal object is about 20 to about 30% w/w, based on the weight of the metal object. In other embodiments, the amount of bainite in the metal object is about 20, about 21, about 22, about 23, about 24, about 25, about 26, about 27, about 28, about 29, about or about 30% w/w, based on the weight to the metal object. In further embodiments, the amount of bainite, martensite, or a combination thereof in the metal object is about 20 to about 29, about 20 about 28, about 20 to about 27, about 20 to about 26, about 20 to about 25, about 20 to about 24, about 20 to about 23, about 20 to about 22, about 20 to about 21, about 21 to about 30, about 21 to about 29, about 21 to about 28, about 21 to about 27, about 21 to about 26, about 21 to about 25, about 21 to about 24, about 21 to about 23, about 21 to about 22, about 22 to about 30, about 22 to about 29, about 22 to about 28, about 22 to about 27, about 22 to about 26, about 22 to about 25, about 22 to about 24, about 22 to about 23, about 23 to about 30, about 23 to about 29, about 23 to about 28, about 23 to about 27, about 23 to about 26, about 23 to about 25, about 23 to about 24, about 24 to about 30, about 24 to about 29, about 24 to about 28, about 24 to about 27, about 24 to about 26, about 24 to about 25, about 25 to about 30, about 25 to about 29, about 25 to about 28, about 25 to about 27, about 25 to about 26, about 26 to about 30, about 26 to about 29, about 26 to about 28, about 26 to about 27, about 27 to about 30, about 27 to about 29, about 27 to about 28, about 28 to about 30, about 28 to about 29, or about 29 to about 30% w/w, based on the weight of the metal object.

One of skill in the art would be able to determine suitable annealing conditions, including temperatures, among others. In still further embodiments, the intercritical annealing temperature is about 600 to about 1000° C. In other embodiments, the intercritical annealing temperature is about 600, about 650, about 700, about 750, about 800, about 850, about 900, about 950, or about 1000° C. In further embodiments, the intercritical annealing temperature is about 600 to about 1000, about 600 to about 900, about 600 to about 800, about 600 to about 700, about 650 to about 1000, about 650 to about 900, about 650 to about 800, about 650 to about 700, about 700 to about 1000, about 700 to about 900, about 700 to about 800, about 750 to about 1000, about 750 to about 900, about 750 to about 800, about 800 to about 1000, about 800 to about 900, about 850 to about 1000, about 850 to about 900, about 900 to about 1000, or about 950 to about 1000° C.

Aspects

Aspect 1. A composition comprising iron and:
   about 0.01 to about 0.4% w/w of manganese;
   about 1.3 to about 1.9% w/w of chromium;
   about 0.1% w/w or less of nickel;
   about 1.2 to about 1.7% w/w of molybdenum;
   about 0.01 to about 0.4% w/w of niobium;

about 0.01 to about 0.4% w/w of vanadium;
   about 1.5 to about 2% w/w of silicon; and about 0.01 to about 0.20% w/w of carbon.

Aspect 2. The composition of Aspect 1, comprising 0% w/w of nickel.

Aspect 3. The composition of Aspect 1, comprising about 0.04 to about 0.1%, preferably about 0.05 to about 0.07%, or preferably about 0.05%, or preferably about 0.1% w/w of nickel.

Aspect 4. The composition of any one of the preceding Aspects, comprising about 0.1 to about 0.3%, preferably about 0.15 to about 0.25%, or preferably about 0.2% w/w of manganese.

Aspect 5. The composition of any one of the preceding Aspects, comprising about 1.4 to about 1.8%, preferably about 1.5 to about 1.7%, or preferably 1.55 to about 1.65%, or preferably about 1.6% w/w of chromium.

Aspect 6. The composition of any one of the preceding Aspects, comprising about 1.3 to about 1.6%, preferably about 1.4 to about 1.5, or preferably about 1.45% w, or preferably about 1.5% w/w of molybdenum.

Aspect 7. The composition of any one of the preceding Aspects, comprising about 0.1 to about 0.3, preferably about 0.15 to about 0.2, or preferably about 0.18% w/w of niobium.

Aspect 8. The composition of any one of the preceding Aspects, comprising about 0.1 to about 0.3, preferably about 0.15 to about 0.2, or preferably about 0.18% w/w of vanadium.

Aspect 9. The composition of any one of the preceding Aspects, comprising about 1.5 to about 1.8%, preferably about 1.5 to about 1.7%, or preferably about 1.6 to about 1.7%, or preferably about 1.6% w/w of silicon.

Aspect 10. The composition of any one of the preceding Aspects, comprising about 0.05 to about 0.14%, preferably about 0.1 to about 0.14%, or preferably about 0.14% w/w of carbon.

Aspect 11. The composition of any one of the preceding Aspects, further comprising sulfur.

Aspect 12. The composition of Aspect 11, comprising about 0.001 to about 0.015%, preferably about 0.005 to about 0.01%, or preferably about 0.006 to about 0.008%, or preferably about 0.007% w/w of sulfur.

Aspect 13. The composition any one of the preceding Aspects, further comprising oxygen.

Aspect 14. The composition of Aspect 13, comprising about 0.01 to about 0.1%, preferably about 0.04 to about 0.08%, or preferably about 0.05 to about 0.07%, or preferably about 0.06% w/w of sulfur.

Aspect 15. The composition of any one of the preceding Aspects, further comprising nitrogen.

Aspect 16. The composition of Aspect 15, comprising about 0.01 to about 0.02%, preferably about 0.015 to about 0.015%, or preferably about 0.01% w/w of nitrogen.

Aspect 17. The composition of any one of the preceding Aspects, that is a metal powder.

Aspect 18. The composition of any one of the preceding Aspects, having a $d_{10}$ particle size of about 1 to about 10μ, a $d_{50}$ particle size of about 10 to about 20μ, or a $d_{90}$ particle size of about 20 to about 30μ, or combinations thereof.

Aspect 19. A method of preparing a metal powder, comprising atomizing the composition of any one of the preceding Aspects.

Aspect 20. The method of Aspect 18, wherein the atomizing is gas or water atomizing.

Aspect 21. A metal powder prepared according to the method of Aspect 18 or 19.

Aspect 22. The metal powder of Aspect 10, having a $d_{10}$ particle size of about 1 to about 10μ, a $d_{50}$ particle size of about 10 to about 20μ, or a $d_{90}$ particle size of about 20 to about 30μ, or combinations thereof.

Aspect 23. A method of preparing a metal object, comprising subjecting the metal powder of Aspect 18 or 19 to metal binder jetting.

Aspect 24. The method of Aspect 20, comprising depositing two or more layers comprising the metal working composition of Aspect 1 onto a substrate.

Aspect 25. The method of Aspect 21, wherein the layers are bound together using a liquid binding agent.

Aspect 26. The method of any one of Aspects 20 to 22, further comprising sintering the metal object.

Aspect 27. The method of Aspect 23, wherein the metal object is sintered at a temperature region at which the crystal structure of the alloy is body centered cubic (BCC) ferrite.

Aspect 28. The method of Aspect 23 or 24, wherein the sintered metal object comprises an about 1:1 ratio of BCC to face centered cubic austenite (FCC).

Aspect 29. The method of any one of Aspects 23 to 25, wherein the sintering temperature is about 700 to about 1500° C.

Aspect 30. The method of any one of Aspects 23 to 26, wherein the density of the sintered metal object is at least about 7 g/cm³.

Aspect 31. The method of any one of Aspects 23 to 27, wherein the sintered metal object is annealed.

Aspect 32. The method of Aspect 28, wherein the intercritical annealing temperature is about 600 to about 1000° C.

Aspect 33. A metal object prepared according to any one of Aspects 23-32.

The following examples are provided to illustrate some of the concepts described within this disclosure. While each Example is considered to provide specific individual embodiments of compositions, methods of preparation and use, none of the Examples should be considered to limit the more general embodiments described herein.

Example 1: Reagents and Procedures

Powders are gas atomized with nitrogen as the atomizing gas. Chemical analysis and powder properties are listed in Tables 1A and 1B. Particle size of each alloy is typical for use in metal binder jetting.

TABLE 1A

| Powder Properties of gas atomized alloys. | | | | | | | |
|---|---|---|---|---|---|---|---|
| Material | Mn | Cr | Ni | Mo | Nb | V | Si |
| FSLA Powder | 0.20 | 1.60 | 0.06 | 1.45 | 0.18 | 0.18 | 1.64 |
| DP 600 Powder | 1.62 | 0.20 | 0.10 | 0.05 | NA | NA | 0.20 |

TABLE 1B

| Powder Properties of gas atomized alloys. | | | | | | | | |
|---|---|---|---|---|---|---|---|---|
| Material | Apparent Density (g/cm³) | Tap Density (g/cm³) | C (w/w) | S (w/w) | O (w/w) | N (w/w) | $d_{10}$ (μ) | $d_{50}$ (μ) | $d_{90}$ (μ) |
| FSLA Powder | 3.2 | 4.9 | 0.14 | 0.007 | 0.06 | 0.01 | 5.7 | 14.0 | 24.4 |
| DP 600 Powder | 3.3 | 4.5 | 0.14 | 0.014 | 0.12 | 0.01 | 5.7 | 15.1 | 26.8 |

All test samples are printed on an HP Multi Jet Fusion Printer, with a water-based binder available in the art at a 50-micron layer thickness.

Test pieces are sintered at DSH Technologies utilizing MIM3045T furnaces from Elnik Systems. These furnaces combine thermal debind and the sinter process all in one furnace. The equipment has a maximum temperature of 1600° C. with partial pressure or vacuum control. The furnace is an all metal process zone with atmosphere capabilities of pure hydrogen, nitrogen, argon, or vacuum environments. Test pieces are sintered in a high temperature Elnik MIM at 1380° C. for 30 min in an atmosphere of 95 v/w nitrogen/5 v/w hydrogen.

For continuous heat treatment, a high temperature Abbott continuous-belt furnace is used at indicated temperatures for 30 min in an atmosphere of 95 v/w nitrogen/5 v/w hydrogen.

Prior to mechanical testing, green and sintered densities, dimensional change (DC), and apparent hardness are determined on the tensile and transverse rupture (TR) samples. Five tensile specimens and five TR specimens are evaluated for each composition. The densities of the green and sintered steels are determined in accordance with MPIF Standard 42. Tensile testing followed MPIF Standard 10 and apparent hardness measurements are made on the tensile and TR specimens, in accordance with MPIF Standard 43.

Porosity measurements are made on metallographically prepared cross-sections removed from entire test parts. A Clemex automated image analysis system is used to measure and map the porosity on as-prepared surfaces using a predetermined gray level to separate the dark void space and from the highly light reflective metallic regions. The pore content also is estimated in both the sample volume and in localized regions.

Specimens for microstructural characterization are prepared using standard metallographic procedures. Subsequently, they are examined by optical microscopy in the polished and etched (2 v/o nital/4 w/o picral) conditions.

In addition, the microstructure is revealed, and color used to separate the transformation products with a two-step, etch/stain, process. First, the microstructure is defined with a light pre-etch by immersing the sample in Vilella's reagent (5 ml HCl+1 g picric acid+100 ml ethyl alcohol), rinsing with warm water, and drying with filtered compressed air. In the second step, the pre-etched sample is immersed in a freshly prepared solution of 10 g sodium metabisulphite ($Na_2S_2O_5$) in 100 ml deionized or distilled water, rinsed with warm water and alcohol, then dried with filtered compressed air.

Example 2: Alloy Design

For metal binder jetting, the as-built density from the printer itself is typically not much higher than the apparent density of the powder (~60%). Despite the fact that many of the additive manufacturing machine manufacturers are now designing the roller system, which spreads the powder, to exert some force on the powder bed to densify the built part, the manner in which the powder fills the print bed dictates the final part density after printing. FIG. 1 highlights that due to the initial low as built density parts printed from metal binder jetting, higher energy input is needed to achieve densities typical of conventional powder metallurgy or MIM processes. FIG. 1 shows that the as built density for 316 L specimens produced by metal binder jetting ranges from 3.8-4.6 g/cm³. As an example, typical densities prior to sintering for 316 L when processed by MIM are around 5.5 g/cm³ and for conventional powder metallurgy typically 6.7 g/cm³ (when compacted at 690 MPa). Therefore, longer sintering times and higher sintering temperatures are needed to achieve the same final densities in metal binder jetting. Even at the higher as built densities and utilizing a very fine powder size (8-12 microns), when the material is sintered at 1260° C. in 100 vol % hydrogen, only densities approaching 7.0 g/cm³ are realized.

In this example, the metal powders of the disclosure are shown to enhance the sinterability of the metal binder jetting part; it sinters in a temperature region at which the crystal structure of the alloy is body centered cubic (BCC) ferrite rather than face centered cubic austenite (FCC). Thus, the metal powder balances the constituents to achieve roughly a 50/50 mixture of austenite and ferrite at the sintering temperature (1380° C.).

The metal powders are prepared using the amounts of carbon, silicon, manganese, molybdenum, nickel and chromium as shown in Table 2.

Another significant difference between the wrought DP600 composition from the art and the metal powder of the disclosure is the presence niobium and vanadium.

Example 3: Density Considerations

In general, the metal binder jetting process cannot achieve full density in comparison to the wrought grade, unless special techniques such as liquid phase sintering or hot isostatically pressing (after initial sintering) are utilized. For this reason, high temperatures and long times at temperature are generally employed for sintering of the green parts.

To maximize the density under these conditions, the metal powder of the disclosure of Example 2 was tested. In summary, the metal powder of Example 2 was subjected to metal binder jetting to provide the green metal object, and the metal object was sintered. The densities of the metal powder, the green metal object, and the sintered metal object was obtained. See, Table 3 which shows the density of metal objects produced with the DP600 wrought iron metal powder and the metal powder of the disclosure in atomized (apparent density), built (green density) and sintered density (final density). The change in density occurred during sintering. Since both materials are subjected to the same sintering cycle, the metal powder of the disclosure exhibits better sinterability than the DP600 product. At the sintering temperatures utilized, the DP600 product is in austenite form (100%) while the metal powder of the disclosure has a microstructure of approximately 50 vol % ferrite and 50

TABLE 2

Nominal chemical composition of wrought DP600 alloy, DP600 atomized powder and new additive manufacturing grade designated as FSLA

| Material[c] | C (w/w) | Si (w/w) | Mn (w/w) | Mo (w/w) | Ni (w/w) | Cr (w/w) |
|---|---|---|---|---|---|---|
| DP600 Wrought[a] | 0.14 (max) | 1.50 (max) | 2.00 (max) | | 1.0 (max) | |
| DP600 Powder[b] | 0.12 | 0.05 | 1.62 | 0.05 | 0.09 | 0.17 |
| Disclosure Metal Powder | 0.14 (max) | 1.60 | 0.17 | 1.50 | 0.10 | 1.60 |

[a] = DP600 product in the form of a solid;
[b] = DP600 product in the form of a powder;
[c] = these materials also contain iron.

Figure 2:
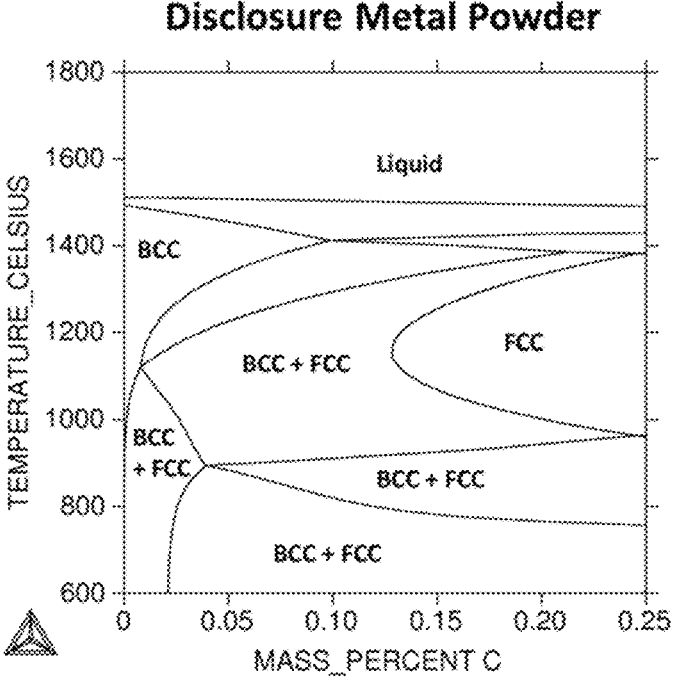
FIG. 2 are phase diagrams for (left) DP600 and new alloy FSLA (right).
Figure 2:
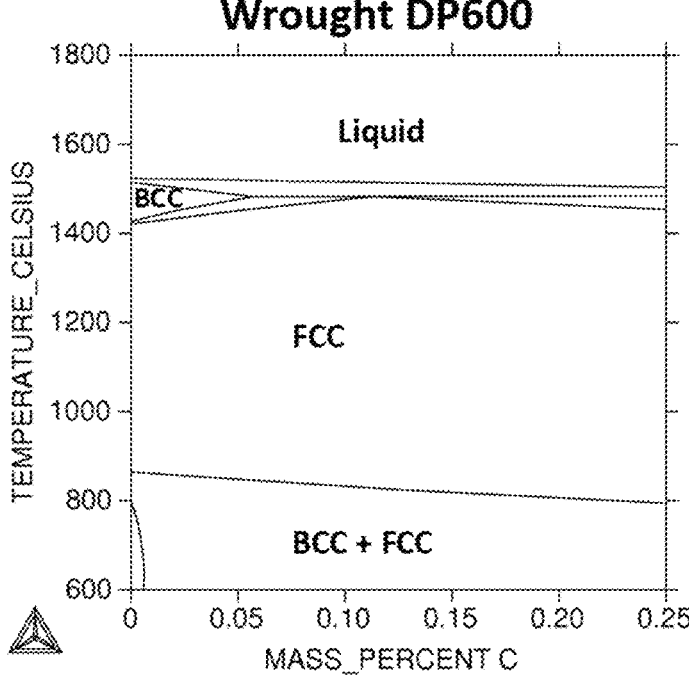

At temperatures above 1120° C., which are commonly used for sintering, the metal powder of the disclosure forms a high percentage of ferrite. FIG. 2 compares the phase diagrams for the metal powder of the disclosure and a conventional DP600 wrought alloy. The DP600 wrought alloy is a dual phase wrought alloy consisting of roughly 20-25% vol % martensite in a ferrite matrix which is normally produced by controlled rolling combined with secondary heat treatment. The DP600 wrought alloy is commonly used in the body structure of the car.

In addition, the conventional composition of dual phase steels, which consists primarily of low carbon levels and up to 2% w/w manganese, is not conducive to the sintering process. In the metal powder of the disclosure, the temperature range, over which the ferrite phase exists, is very broad and corresponds to typical sintering temperatures (700 to 1400° C.). A comparison of the phases existing in a standard dual phase steel (DP600) over the same temperature range, indicate only austenite exists in the temperature window for sintering.

vol % austenite. Further, the density increase for the metal powder of the disclosure is quite dramatic approaching 1 g/cm³.

TABLE 3

Density of DP600 and FSLA at various stages of the process

| Material | Apparent Density (g/cm³) | As Build Density (g/cm³) | Sintered Density (g/cm³) |
|---|---|---|---|
| DP600 Powder | 4.25 | 4.13 | 6.53 |
| Disclosure Metal Powder | 4.00 | 4.64 | 7.48 |

Example 4: Processing of the Metal Compositions

Figure 3:
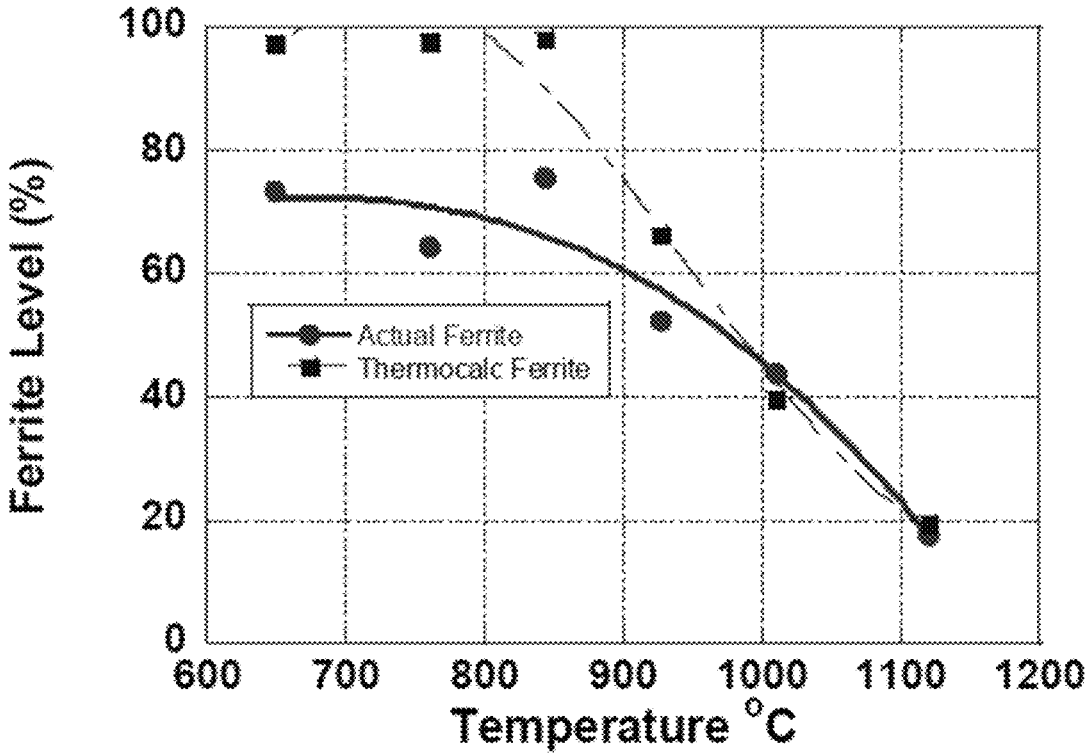
FIG. 3 is a plot of measured values of ferrite versus calculated levels as a function of the intercritical anneal temperature of the FSLA alloy.

Intercritical annealing is a processing step in producing dual phase steels. The intercritical anneal temperature is chosen to control the volume fractions of the ferrite and austenite (which then transforms during cooling). In order to ascertain the intercritical annealing temperature for the metal powder of the disclosure to produce 20-30% of the transformation products (e.g., microstructure of either bainite or martensite prepared by cooling), individual samples of the sintered metal object of Example 3 are heated to various temperatures within in the austenite/ferrite region as shown in the FSLA phase diagram. See, FIG. 2. Samples are quenched and then microstructural analysis used to determine the level of ferrite in the microstructure and compared to the predictions made using a thermodynamic software package (Thermocalc). The results of this experiment are shown in FIG. 3.

Figure 4:
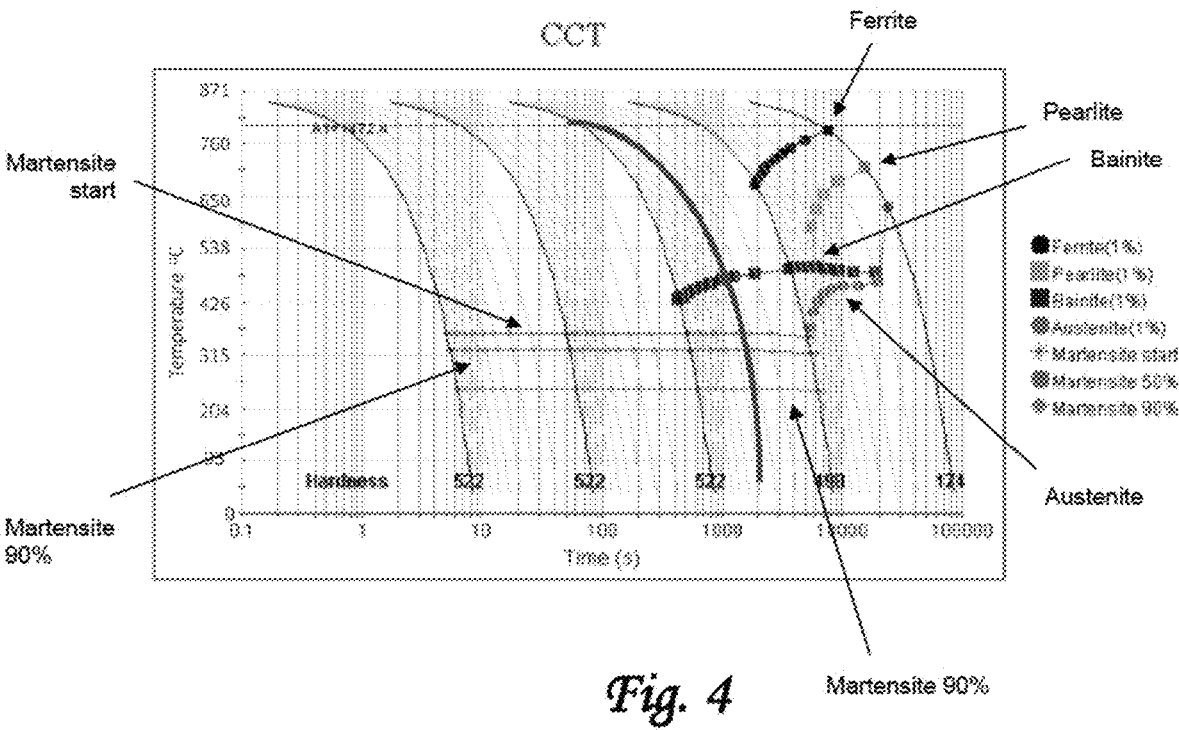
FIG. 4 is CCT diagram for FSLA Alloy highlighting cooling rates that transform the structure to bainite or martensite (intercritical anneal temperature 865° C., starting grain size 100 microns).

In general, the agreement between the actual measured values and those predicted is good. The results indicate that in order to achieve a microstructure of about 20-30% of bainite/martensite, an intercritical annealing temperature of about 750 to 950° C. is utilized. Another component of the intercritical annealing process is the cooling rate. FIG. 4 shows a Continuous Cooling Transformation Diagram (CCT Diagram) for the metal powder of the disclosure. See, Tables 1A and 1B.

The cooling rate achieved utilizing the continuous belt furnace is shown in FIG. 4 in the CCT diagram as the vertical line between the hardness of 498 and 522. The samples are heated to 843° C. which placed the material into the two-phase region of the phase diagram (FIG. 2) which contained unstable austenite and stable ferrite. The maximum cooling rate of the furnace is utilized, 1.3° C./sec (as indicated by the vertical line between the hardness of 498 and 522). The CCT diagram indicates that the unstable austenite when cooled from 843° C. will transform to bainite. To form martensite, a cooling rate of 16-20° C./see should be utilized.

Figure 5A:
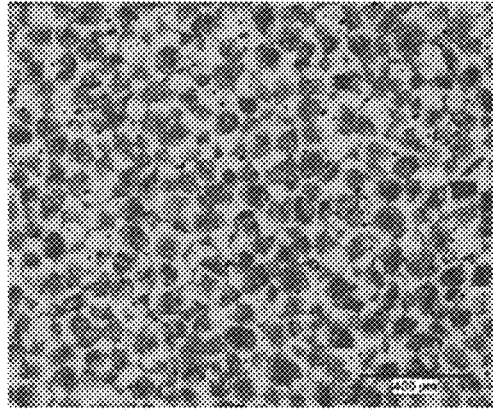
FIGS. 5A and 5B are photographs showing the microstructure of FSLA alloy inter-critically annealed at 843° C. and cooled at a rate of 1.3° C./sec.
Figure 5B:
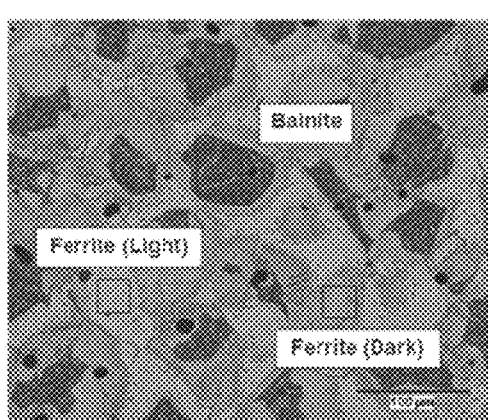

Upon cooling, the CCT curve indicates that the unstable austenite will transform to bainite at the used cooling rate. The resulting microstructure is shown in FIG. 5. The structure shows that the original unstable austenite has transformed to bainite and the two different forms of ferrite. There is ferrite surrounding the transformation product (bainite) that due to the change in crystal structure of the austenite upon cooling gets deformed and dislocations form within the adjacent ferrite. The dislocations in the ferrite generally lead to an increase in the work hardening rate and increase the strength of the ferrite.

A second ferrite that is located away from this transformation and adjacent to the dislocated ferrite that is not stressed also is present. Table 4 shows the percentage of each phase along with the micro-indentation hardness corresponding to each. The ferrite with the dislocated structure has a higher hardness.

TABLE 4

Percentage of phases and corresponding micro-indentation hardness of each phase using a metal powder of the disclosure intercritically annealed at 850° C. and cooled at 1.3° C./sec.

|  | % Bainite | % Ferrite (Light) | % Ferrite (Dark) |
|---|---|---|---|
| % of Phase | 19.2 | 34.4 | 46.4 |
| Micro-indentation Hardness | 360 (HV50gf) | 284 (HV50gf) | 321 (HV50gf) |

Figure 6:
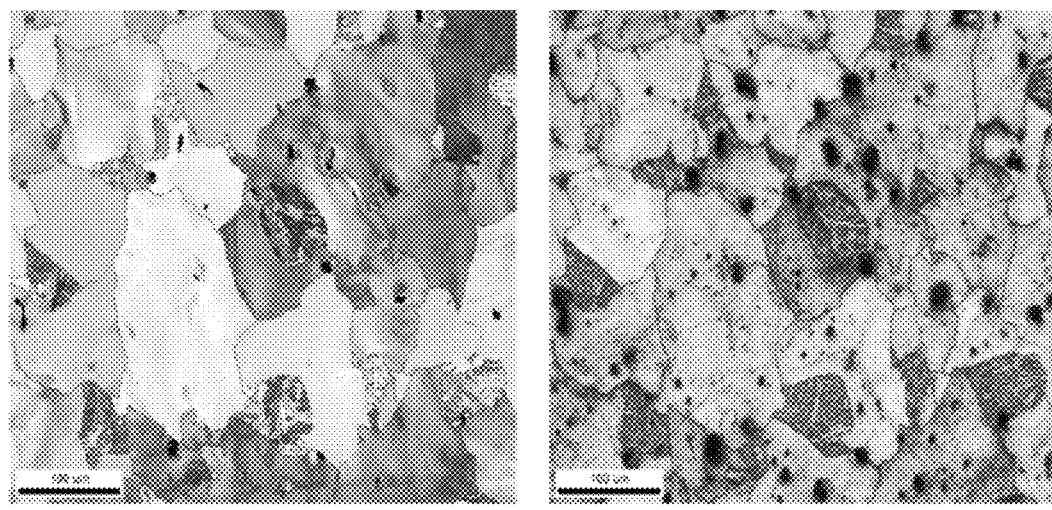
FIG. 6 are photographs showing electron backscattered diffraction of FSLA intercritically annealed at 850° C. and cooled at 1.3° C./sec.

FIG. 6 shows electron backscattered diffraction (EBSD) results of the microstructure of the annealed metal powder of the disclosure. As known in the art, EBSD is a technique utilized to measure the amount of phases and stresses in the metal object microstructure. These EBSD results show that ferrite grains next to the transformation products (bainite in this case) contain a significant amount of dislocations. These dislocations contribute to the work-hardening of the alloy and provide a metal object with high ultimate tensile strength with continuous yielding and high ductility.

Figure 7A:
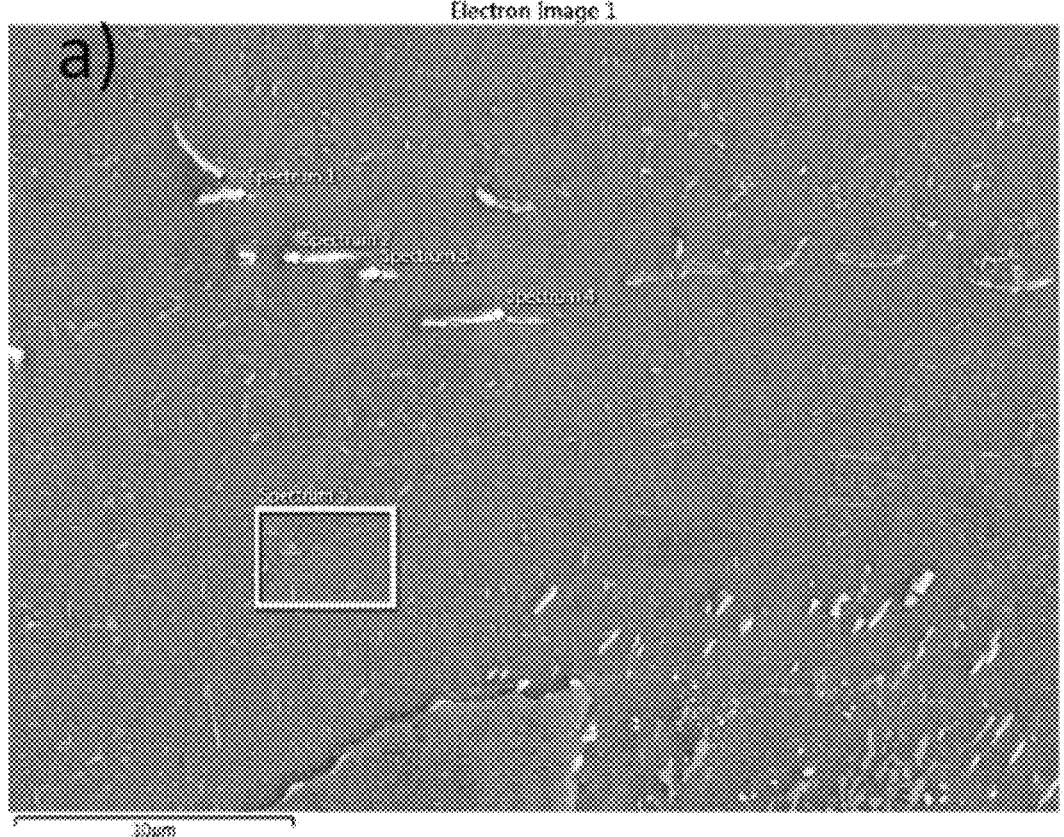
FIGS. 7A and 7B are SEM micrographs and corresponding EDS of precipitates.
Figure 7B:
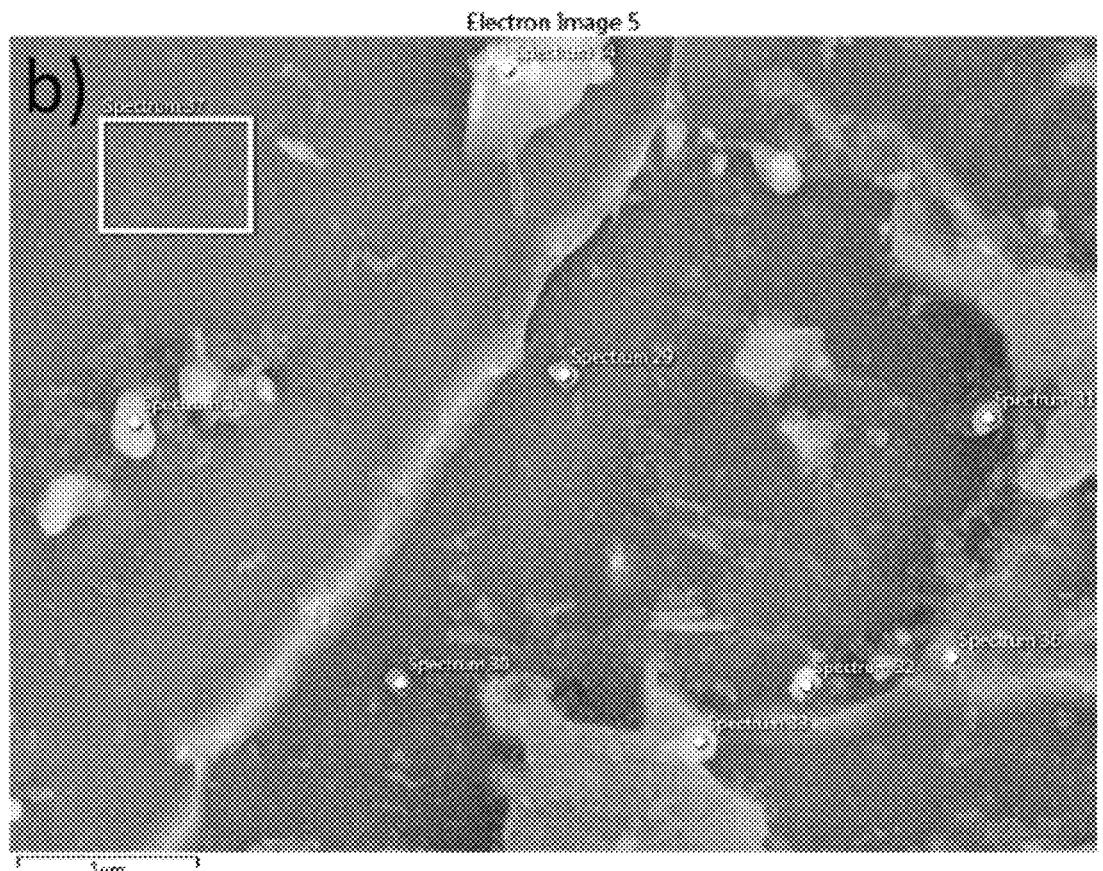

The degree of the precipitation strengthening in metal objects depends on the volume fraction, the size, and the type of precipitates, among others. FIG. 7 shows examples of precipitates that form in the metal powder of the disclosure after heat treatment. Examples shown by scanning electron microscopy (SEM) and energy dispersive X-ray Spectroscopy (EDS) shows the presence of both individual niobium rich carbides along with networks of molybdenum rich carbides. See, the spectral data in Tables 5 and 6.

TABLE 5

| | Spectrum Label | | | | |
|---|---|---|---|---|---|
| | Spectrum 29 | Spectrum 30 | Spectrum 31 | Spectrum 32 | Spectrum 33 |
| C | 8.79 | 9.15 | 8.03 | 10.39 | 10.03 |
| Si | 2.22 | 2.15 | 2.20 | 2.49 | 2.18 |
| V | 0.33 | 0.35 | 0.29 | 0.37 | 0.32 |
| Cr | 2.09 | 1.98 | 1.86 | 1.90 | 1.95 |
| Fe | 77.70 | 78.42 | 80.90 | 76.30 | 77.86 |
| Mo | 8.87 | 7.97 | 6.72 | 8.56 | 7.36 |
| Total | 100.00 | 100.00 | 100.00 | 100.00 | 100.00 |

TABLE 6

| | Spectrum Label | | | |
|---|---|---|---|---|
| | Spectrum 34 | Spectrum 35 | Spectrum 36 | Spectrum 37 |
| C | 15.79 | 9.45 | 9.43 | 5.96 |
| Si | 1.84 | 2.20 | 2.30 | 1.43 |
| V | 0.30 | 0.34 | 0.35 | |
| Cr | 1.60 | 1.97 | 1.89 | 1.74 |
| Fe | 69.68 | 78.04 | 79.34 | 89.91 |
| Mo | 5.03 | 8.01 | 6.69 | 0.96 |
| Total | 100.00 | 100.00 | 100.00 | 100.00 |

When the precipitates are located within the grains, they impede dislocation motion and therefore increase the strength and hardness of the alloy. After sintering, any precipitates located at the grain boundaries pin the grain boundaries and limit grain growth during the intercritical annealing step. This restriction of grain growth also improves the strength of the material.

Figure 10:
FIG. 10 is a bar graph showing the calculation of strength contribution.

The typical size of the NbC, VN or TiC in wrought steels is between 2 to 100 nanometers. When using the metal powder of the disclosure and sintering conditions of 1380° C. in an atmosphere is 95% nitrogen and 5% hydrogen, NbC, VC and other alloyed carbides are observed. The average size of the precipitates is between 0.3 and 0.4 microns (300 to 400 nanometers), which contributes to the higher strength of the metal object. See, FIG. 8. The precipitates are formed during sintering in the ferrite phase field. The precipitation strengthening is calculated using the following calculation for this coarser particle size and found to be between 40 and 50 MPa. See, FIG. 10. This is a significant contribution of strength by precipitation hardening.

$$\sigma_{ppt} = \left(\frac{0.538 * G * b * f^{1/2}}{X}\right) * \ln\left(\frac{X}{2b}\right)$$

| Variable | Utilized Variable |
|---|---|
| X = average precipitates diameter (μm) | — |
| f = precipitates area fraction (%) | — |
| d = average grain size (mm) | — |
| $\sigma_0$ = lattice friction stress (MPa) | 80 (MPa) |
| $k_y$ = Hall Petch factor (MPa*mm$^{1/2}$) | 24 |
| b = Burger's vector (μm) | 0.00025 |
| G = Matrix shear modulus (MPa) | 83000 |

Example 6: Properties

In this example, it is shown that the metal powder of the disclosure of Example 2, once sintered and heat treated, together with metal binder jetting provides a metal object alloy that achieves a mechanical property level of a conventional DP600 wrought alloy, i.e., an ultimate tensile strength of at least about 600 MPa.

To evaluate the level of the mechanical properties and consistency of the binder jet printing along with the sintering and heat treatment, separate print runs are processed with the same parameters for each step but at different times. The properties of these individual runs are shown in Table 7 along with a typical wrought specification. The ultimate tensile strength and yield strength of the metal powder of the disclosure was similar to the wrought DP600 while the elongation percentage is somewhat lower than the minimum. Based on the porosity data, the metal powder of the disclosure reached only 97-98% of the theoretical density.

TABLE 7

Mechanical Properties of various print runs of the metal binder jetting FSLA alloy

| As Built | UTS (MPa) | 0.2% YS (MPa) | Elongation (%) | Hardness (HRA) |
|---|---|---|---|---|
| DP500 (Salzgitter) | 580-670 | 330-470 | 24 (min) | — |
| Run 1 | 684 | 397 | 19.9 | 51 |
| Run 2 | 691 | 383 | 19.4 | 49 |
| Run 3 | 673 | 387 | 20.3 | 50 |
| Run 4 | 692 | 404 | 19.9 | 52 |
| Run 5 | 696 | 404 | 19.2 | 52 |
| Run 6 | 683 | 396 | 19.4 | 51 |
| Average | 687 | 395 | 19.7 | 51 |

Example 7: Annealing Temperature Variations

As discussed previously, one of the advantages of a dual-phase material, is that it can be intercritically annealed at temperatures which vary the level of austenite and ferrite. Therefore, heat treatments can be developed to produce a range of properties with the same alloy. See FIG. 3.

The metal powders discussed herein may be utilized to meet a range of properties of the produced metal object. For example, for metal binder jetting materials, developing print parameters and sintering profiles can be time consuming and influenced by the composition of the metal powder. Having one metal powder that covers a range of properties leads to faster material development and industrialization. Table 8 shows a range of properties of the FSLA material achieved with the same printing and sintering parameters, but different intercritical anneal temperatures and cooling rates.

TABLE 8

Mechanical Properties of metal binder jetting FSLA alloy utilizing various Intercritical Annealing Temperatures

| As Built | UTS (MPa) | 0.2% YS (MPa) | Elongation (%) | Hardness (HRA) |
|---|---|---|---|---|
| As Built | 712 | 393 | 10.1 | 55 |
| IA 650° C. | 792 | 473 | 9.6 | 55 |
| IA 760° C. | 734 | 459 | 14.0 | 56 |
| IA 843° C. | 708 | 408 | 19.3 | 53 |

Table 8 shows that a the FSLA alloy exhibits a range of UTS strengths from 700-800 MPa (an increase in 15%) with just a change in the intercritical anneal temperature. As the strength increases the ductility decreases.

Figure 8:
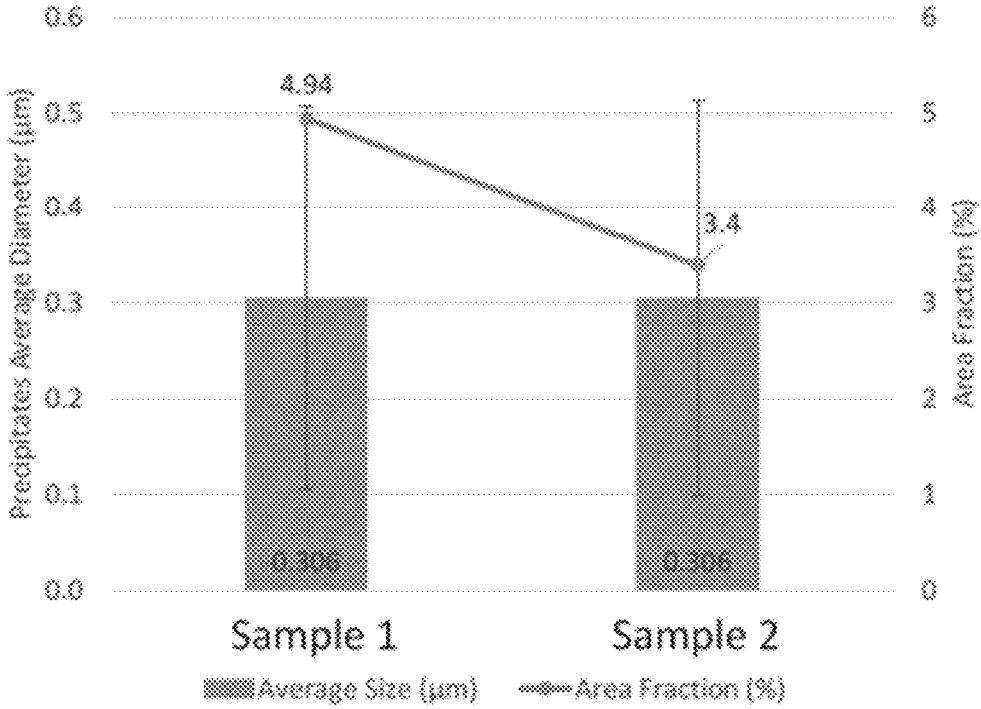
FIG. 8 is a bar graph showing average precipitate diameter in microns and area fraction of precipitates in two FSLA samples after intercritically annealing.
Figure 9:
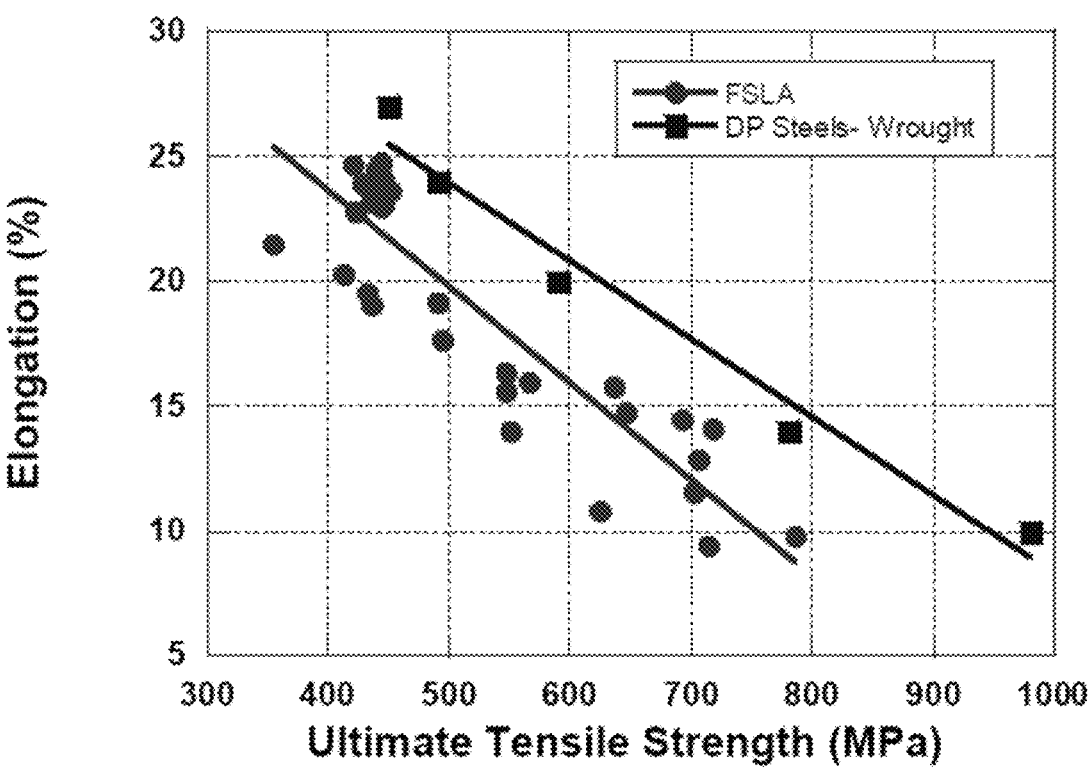
FIG. 9 is a line graph showing the comparison of FSLA with wrought versions of dual phase steels.

While the expectation for all additive manufacturing processes is high, metal binder jetting suffers from the fact that without special techniques, such as liquid phase sintering or hot isostatic pressing, full density cannot be achieved. FIG. 8 shows how the metal powder of the disclosure with various heat treatments and carbon levels compares with typical dual phase steels. As previously mentioned, due to the porosity still remaining in the metal powder of the disclosure (about 2.5%), the ductility still is lower than the conventional dual phase steels (about 20% versus minimum of 24%).

The contents of all references, patent applications, patents, and published patent applications, as well as the Figures, cited throughout this application are hereby incorporated by reference.

Those skilled in the art will recognize, or be able to ascertain using no more than routine experimentation, many equivalents to the specific embodiments of the disclosure described herein. such equivalents are intended to be encompassed by the following claims.

The invention claimed is:

1. A method of preparing a dual-phase microstructure sintered metal object, comprising:
   (i) atomizing an iron-based composition to form a metal powder, wherein the iron-based composition comprises:
   0.01 to 0.4% w/w of manganese;
   1.3 to 1.9% w/w of chromium;
   0.1% w/w or less of nickel;
   1, 2 to 1.7% w/w of molybdenum;
   0.01 to 0.4% w/w of niobium;
   0.01 to 0.4% w/w of vanadium;
   1.5 to 2% w/w of silicon; and
   0.01 to 0.16% w/w of carbon;
   wherein the balance of the iron-based composition comprises iron and the iron comprises no more than 1.0% w/w, based on the total weight of the iron-based composition, of normal impurities;
   (ii) depositing two or more layers of the metal powder to form a component; and
   (iii) sintering the component at a temperature for the sintering is 700 to 1500° C. to provide a two phase microstructure comprising austenite and ferrite and having a density of at least 7 g/cm$^3$; and
   (iv) cooling the component of (iii) to provide the dual-phase microstructure sintered metal object comprising (a) ferrite and (b) at least one of martensite or bainite.

2. The method of claim 1, wherein the iron-based composition comprises 0% w/w of nickel.

3. The method of claim 1, wherein the iron-based composition comprises 0.04 to 0.1% w/w of nickel.

4. The method of claim 1, wherein the iron-based composition comprises 0.1 to 0.3% w/w of manganese.

5. The method of claim 1, wherein the iron-based composition comprises 1.4 to 1.8% w/w of chromium.

6. The method of claim 1, wherein the iron-based composition comprises 1.3 to 1.6% w/w of molybdenum.

7. The method of claim 1, wherein the iron-based composition comprises 0.1 to 0.3% w/w of niobium.

8. The method of claim 1, wherein the iron-based composition comprises 0.1 to 0.3% w/w of vanadium.

9. The method of claim 1, wherein the iron-based composition comprises 1.5 to 1.8% w/w of silicon.

10. The method of claim 1, wherein the iron-based composition comprises 0.05 to 0.14% w/w of carbon.

11. The method of claim 1, wherein the iron-based composition further comprises sulfur.

12. The method of claim 11, wherein the iron-based composition comprises 0.001 to 0.015% w/w of sulfur.

13. The method of claim 1, wherein the iron-based composition further comprises oxygen.

14. The method of claim 13, wherein the iron-based composition comprises 0.01 to 0.1% w/w of oxygen.

15. The method of claim 1, wherein the iron-based composition further comprises nitrogen.

16. The method of claim 15, wherein the iron-based composition comprises 0.01 to 0.02% w/w of nitrogen.

17. The method of claim 1, wherein the metal powder has a $d_{10}$ particle size of 1 to 10µ, a $d_{50}$ particle size of 10 to 20µ, or a do particle size of 20 to 30µ, or combinations thereof.

18. The method of claim 1, wherein the atomizing is gas or water atomizing.

19. The method of claim 1, wherein the layers are bound together using a liquid binding agent.

20. The method of claim 1, wherein the depositing is performed on a metal substrate.

21. The method of claim 1, further comprising annealing the sintered metal object.

22. The method of claim 21, wherein an intercritical temperature for the annealing is 600 to 1000° C.

23. The method of claim 1, wherein the iron-based composition further comprises:
0.001 to 0.015% w/w of sulfur;
0.01 to 0.1% w/w of oxygen; and
0.01 to 0.02% w/w of nitrogen.

24. The method of claim 1, wherein the iron-based composition comprises:
0.1 to 0.3% w/w of manganese;
1.4 to 1.8% w/w of chromium;
0.04 to 0.1% w/w of nickel;
1.3 to 1.6% w/w of molybdenum;
0.1 to 0.3 w/w of niobium;
0.1 to 0.3 w/w of vanadium;
1.5 to 1.8% w/w of silicon; and
0.05 to 0.14% w/w of carbon.

25. The method of claim 1, wherein the iron-based composition comprises:
0.01 to 0.4% w/w of manganese;
1.3 to 1.9% w/w of chromium;
0.1% w/w or less of nickel;
1, 2 to 1.7% w/w of molybdenum;
0.01 to 0.4% w/w of niobium;
0.01 to 0.4% w/w of vanadium;
1.5 to 2% w/w of silicon; and
0.01 to 0.16% w/w of carbon.

26. The method of claim 1, wherein the iron-based composition consists essentially of:
0.01 to 0.4% w/w of manganese;
1.3 to 1.9% w/w of chromium;
0.1% w/w or less of nickel;
1, 2 to 1.7% w/w of molybdenum;
0.01 to 0.4% w/w of niobium;
0.01 to 0.4% w/w of vanadium;
1.5 to 2% w/w of silicon; and
0.01 to 0.16% w/w of carbon.

* * * * *